United States Patent
Nagarkar

(10) Patent No.: US 11,704,422 B2
(45) Date of Patent: Jul. 18, 2023

(54) HARDWARE AGNOSTIC PLATFORM FOR TRANSPARENT ACCESS CONTROL OF INTERNET OF EVERYTHING (IOE) DESTINATIONS VIA CORRELATION, CLASSIFICATION, AND/OR TAGGING

(71) Applicant: YESHOG, LLC, Seattle, WA (US)

(72) Inventor: Yogesh Vinayak Nagarkar, Seattle, WA (US)

(73) Assignee: YESHOG, LLC, Seattle, WA (US)

(*) Notice: Subject to any disclaimer, the term of this patent is extended or adjusted under 35 U.S.C. 154(b) by 376 days.

(21) Appl. No.: 16/935,849

(22) Filed: Jul. 22, 2020

(65) Prior Publication Data

US 2020/0356690 A1    Nov. 12, 2020

Related U.S. Application Data

(63) Continuation of application No. 15/779,495, filed as application No. PCT/US2016/063854 on Nov. 28, 2016, now Pat. No. 10,764,333.

(Continued)

(51) Int. Cl.
*H04L 29/06* (2006.01)
*G06F 21/62* (2013.01)
*H04L 9/40* (2022.01)
*H04W 12/08* (2021.01)
*H04W 12/088* (2021.01)

(52) U.S. Cl.
CPC ...... *G06F 21/6218* (2013.01); *H04L 63/0227* (2013.01); *H04L 63/10* (2013.01);
(Continued)

(58) Field of Classification Search
CPC ... H04L 63/0227; H04L 63/10; H04L 63/101; H04L 63/20; H04L 63/205; G06F 21/6218; H04W 12/08
See application file for complete search history.

(56) References Cited

U.S. PATENT DOCUMENTS 8,990,392 B1 * 3/2015 Stamos .................. H04L 43/10
709/224
9,563,771 B2    2/2017 Lang et al.
(Continued)

OTHER PUBLICATIONS

Taiwanese Office Action for Taiwan Application No. 105139220 dated Oct. 29, 2020, 7 pages.
(Continued)

*Primary Examiner* — Jeffrey C Pwu
*Assistant Examiner* — Thong P Truong
(74) *Attorney, Agent, or Firm* — Amin, Turocy & Watson, LLP

(57) ABSTRACT

Simplified and/or user friendly interfaces can be employed to facilitate administration of a routing platform that couples devices of a local area network (LAN) to an external communication network (e.g., the Internet). In one aspect, the routing platform comprises a firewall that can be employed to perform access control and/or an Internet of Things (IoT) hub that can be employed to control operations of IoT devices of the LAN, for example, based on domain information, user-defined tags and peer-defined criteria to make correlations that are leveraged to implement access control policies. A search and command interface is employable to issue textual (e.g., natural language) commands to configure access control policies, tags for devices and/or websites, and/or search for data.

20 Claims, 22 Drawing Sheets

Related U.S. Application Data

(60) Provisional application No. 62/360,961, filed on Jul. 11, 2016, provisional application No. 62/261,224, filed on Nov. 30, 2015.

(52) U.S. Cl.
CPC ............ *H04L 63/101* (2013.01); *H04L 63/20* (2013.01); *H04L 63/205* (2013.01); *H04W 12/08* (2013.01); *H04W 12/088* (2021.01)

(56) References Cited

U.S. PATENT DOCUMENTS

| | | | |
|---|---|---|---|
| 2015/0269383 A1* | 9/2015 | Lang | G06F 21/604 726/1 |
| 2015/0286759 A1 | 10/2015 | Rehtanz et al. | |
| 2016/0102878 A1 | 4/2016 | Smith et al. | |

OTHER PUBLICATIONS

Non-Final Office Action received for U.S. Appl. No. 15/779,495 dated Jan. 30, 2020, 24 pages.
International Search Report for PCT Application No. PCT/US2016/063854, dated Mar. 2, 2017, 2 pages.
OnHub from Google. Better. Faster. Router. [https://on.google.com/hub], retreived May 16, 2018, 17 pages.
Taiwanese Office Action for Taiwan Application No. 105139220 dated Jun. 19, 2020, 16 pages.

* cited by examiner

HARDWARE AGNOSTIC PLATFORM FOR TRANSPARENT ACCESS CONTROL OF INTERNET OF EVERYTHING (IOE) DESTINATIONS VIA CORRELATION, CLASSIFICATION, AND/OR TAGGING

CROSS REFERENCE TO RELATED APPLICATIONS

The subject patent application is a continuation of, and claims priority to each of, U.S. patent application Ser. No. 15/779,495 (now U.S. Pat. No. 10,764,333), filed May 25, 2018, and entitled "A HARDWARE AGNOSTIC PLATFORM FOR TRANSPARENT ACCESS CONTROL OF INTERNET OF EVERYTHING (IOE) DESTINATIONS VIA CORRELATION, CLASSIFICATION, AND/OR TAGGING," which application is a U.S. National Stage filing under 35 U.S.C. § 371 of international patent cooperation treaty (PCT) application No. PCT/US2016/063854, filed Nov. 28, 2016, and entitled "A HARDWARE AGNOSTIC PLATFORM FOR TRANSPARENT ACCESS CONTROL OF INTERNET OF EVERYTHING (IOE) DESTINATIONS VIA CORRELATION, CLASSIFICATION, AND/OR TAGGING", each of which applications claim further priority to U.S. Provisional Application No. 62/261,224, entitled "ROUTER, FIREWALL AND INTERNET OF THINGS PLATFORM AND DEVICES," and filed Nov. 30, 2015 and to U.S. Provisional Application No. 62/360,961, entitled "ROUTER, FIREWALL AND INTERNET OF THINGS PLATFORM AND DEVICES," and filed Jul. 11, 2016. The entireties of each of the above noted applications and patents are hereby incorporated herein by reference.

TECHNICAL FIELD

The subject disclosure relates to wireless communications, e.g., a hardware agnostic platform for transparent access control of Internet of Everything (IoE) destinations via correlation, classification, and/or tagging.

BACKGROUND

Conventional routers, firewalls, Internet of things (IoT) management devices and/or platforms do not have user-friendly designs and are not easy to set-up or configure. Typically, user interfaces employed to control and/or interact with these devices are riddled with complex elements or sub applications that need to be opened and browsed to perform management actions. Thus, most non-tech savvy users find device management complicated and confusing.

As the number of devices connected to wireless routers increases, security concerns associated with access to malicious entities have grown. As an example, most home routers and non-tech savvy users are unaware of the websites to which their Internet connected devices are coupled. Moreover, conventional firewall user interfaces for implementing policies to block access to malicious websites are extremely complex and are usually implemented by trained security professionals. For example, to block a user or a device from access to a website, the process implemented by a conventional firewall policy implementation would involve the following steps: (1) identify source Internet address of the device; (2) identify destination internet protocol (IP) address of the blocked website; (3) create a policy for source (e.g., user device) and destination (e.g., website); (4) repeat steps 1 to 3 for each site that needs to be blocked. In this scenario, the administrator or appliance user would have to reconfigure the policy (e.g., repeat steps 1-3) for any change in source address, appliance location, etc. Filtering and/or management of internet addresses via conventional interfaces is also a cumbersome task and needs complex internet address management tools.

DETAILED DESCRIPTION

Figure 1A:
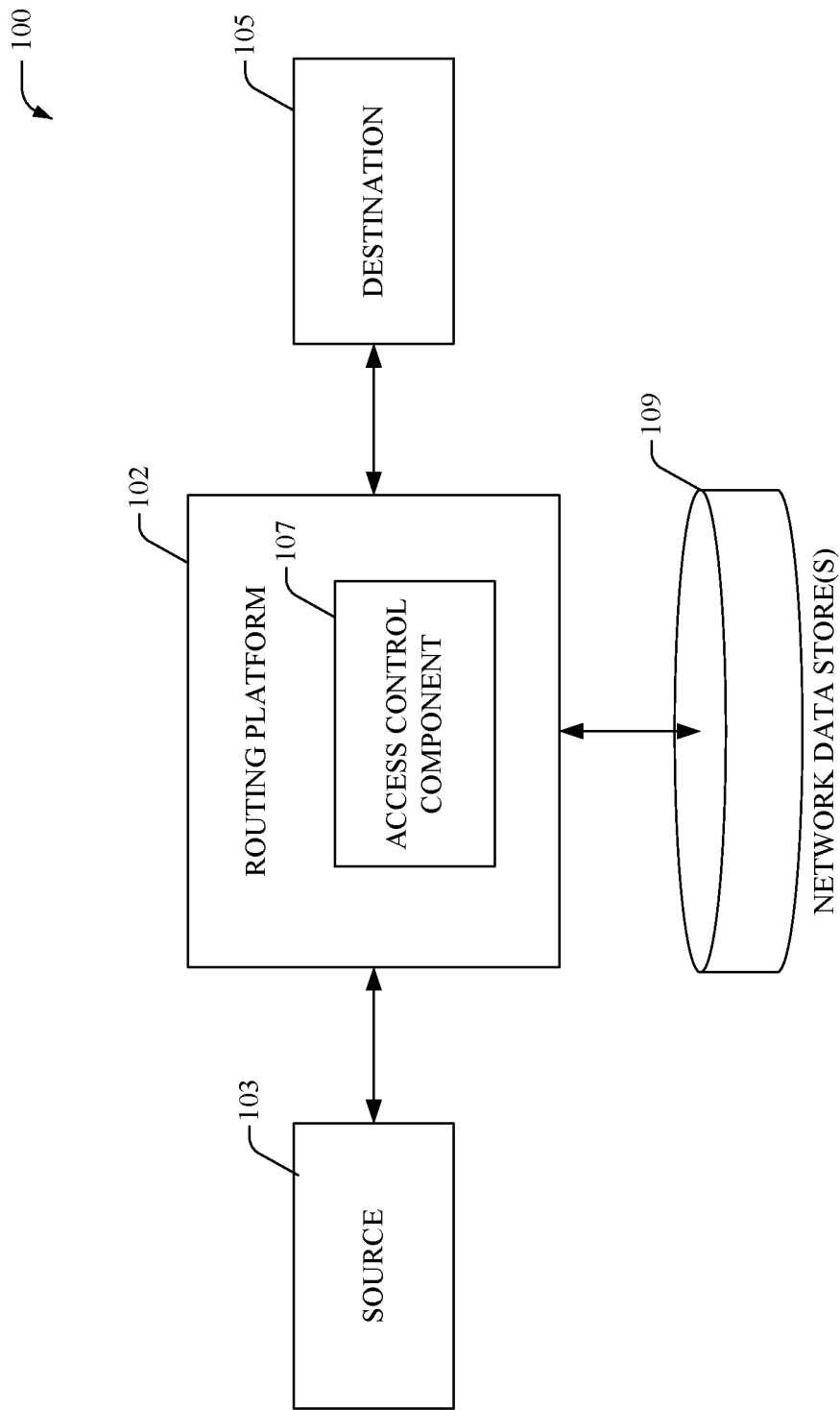
FIGS. 1A and 1B illustrate example systems that comprises a router platform application for implementing access control and/or device management.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "server," "controller," "entity," "element," "engine," "hub," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "administrator," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth. Aspects or features of the disclosed subject matter can be exploited in substantially any wired or wireless communication technology; e.g., Wi-Fi, Worldwide Interoperability for Microwave Access (WiMAX), cellular technologies, or another IEEE 802.XX technology, etc.

Conventional routers, for example, home Wi-Fi routers, are complicated and tedious to configure, especially for non-tech savvy users. Typically, routing policies employed by the router are static and are configured by trained security professionals. With the number of connected devices that are capable of establishing connectivity with other devices and/or passive objects to exchange data steadily rising, there is a growing need for easy-to-use and/or efficient interfaces to access and/or manage these devices. The systems and methods disclosed herein relate to a routing platform with user interfaces that simply administration of the platform.

The systems and methods described herein, in one or more embodiments thereof, relate to access control via correlation of user-defined tags, destination domains, and/or peer-assigned criterion. As an example, a routing platform implements the access control via firewall operations and/or Internet of Things (IoT) device management. In one aspect, the system comprises a processor and a memory that stores executable instructions that, when executed by the processor, facilitate performance of operations. The operations comprise in response to receiving communication data that is to be routed from a source device to a destination device via a routing platform device, determining tag data associated with the communication data based on a correlation of information related to the communication data, wherein the tag data is employable to classify at least one of the source device or the destination device. Further, the operations comprise determining, based on the tag data, policy data indicative of an access control policy that is associated with at least one of prohibiting or allowing a transmission of the communication data from the source device to the destination device An aspect of the disclosed subject matter relates to a method that comprises determining, by a routing platform device comprising a processor, configuration data that is employable to configure the routing platform device that facilitates routing of communication data between network devices of one or more communication network coupled to the routing platform device, wherein the configuration data comprises tag data that assigns a tag at least one of a device coupled to the routing platform device or a subscriber identity associated with the device, and wherein the configuration data further comprises policy data indicative of an access control policy that employs the tag. Further, the method comprises storing, by the routing platform device, the configuration data.

Yet another aspect of the disclosed subject matter relates to a machine-readable storage medium, comprising executable instructions that, when executed by a processor, facilitate performance of operations, comprising: employing a user interface to receive configuration data that is employable to configure a routing platform device, wherein the routing platform device is employable to route communication data between a devices of one or more communication networks coupled to the routing platform device, and wherein the configuration data comprises tag data that classifies at least one of a source device, a destination device, or a user identity associated with the communication data; and storing the configuration data.

Referring initially to FIG. 1A, there illustrated is an example system 100 that comprises a routing platform application for transparent access control of Internet of everything (IoE) destinations via correlation, classification, and/or tagging, according to one or more aspects of the disclosed subject matter. System 100 comprises a routing platform 102 that manages communication between a source 103 and a destination 105. In one aspect, the source 103 and destination 105 can be part of different communication networks (e.g., the source 103 can be part of a local area network (LAN) and the destination 105 can be part of and/or coupled to a wide area network (WAN)), and/or can be part of the same network (e.g., both the source 103 and the destination 105 can be part of the LAN). As an example, source 103 and/or destination 105 can comprise, but is not limited to, a user account, user equipment (UE), one or more Internet of Things (IoT) resources, and/or one or more domain name service (DNS) records.

According to an embodiment an access control component 107 can be employed to implement routing and/or access policies that deny and/or authorize communications from the source 103 to the destination 105. Moreover, the access control component 107 can facilitate access to and/or control of the destination 105 via tags, criteria, and/or correlation, for example, associated with the destination 105, source 103 and/or the communication (e.g., a type of communication, a user that initiates the communication, etc.). In one aspect, the tag and/or criteria data points can be configured by a user and/or imported from a shared network data store(s) 109 (e.g., cloud storage). As an example, during configuration, an administrator can specify that the tag and/or criteria data points (and/or a portion thereof) be kept private for uniform policy control or be kept public, for example, copied to the shared network data store 109 for out of the box policy from community review and/or rating.

In one aspect, during configuration (and/or at most any other time), the administrator can define a tag that names a group of sources and/or destinations. For example, source 103 can comprise a phone that can be tagged as "child's device" and destination 105 can comprise a website that can be tagged as "evilwebsite." The access control component 107 can perform a correlation by identifying one or more tags associated with the source 103 and/or destination 105, and/or one or more defined criterion, for example, administrator-defined policy. Based on the correlation, the access control component 107 can determine whether the communication from the source 103 to the destination 105 is to be allowed or denied.

Consider an example scenario, wherein a user (e.g., user identity) can access one or more devices coupled to the routing platform 102. In this example scenario, tagging the user account and/or devices with a common tag ensures uniform policy implementation. For example, an administrator can enter the following example commands via an interface of the routing platform 102 (e.g., a search and command interface described in detail with respect to FIG. 4):

1. tag user@smartTV as Tim's devices;
2. tag user@Tim's cellphone as Tim's devices;
3. block Tim's devices from videositeXYZ.

Subsequent to the above configuration, the access control component 107 can ensure that videositeXYZ is blocked independent of the equipment that user "Tim" tries to access it from. In another example, the policy can be linked to a subscriber account, for example, the administrator can enter the following example command: block "Tim" from videositeXYZ. Based on this policy, the routing platform 102 can block the videositeXYZ from all devices that have Tim as a actively logged-on user.

After the tags and/or policies are created (e.g., "tag Facebook as social media," "block social media websites between 9 AM to 5 PM,"), the administrator can share the tags and/or policies by issuing a command via the interface (e.g., "share tag social media"). On receiving the command, the selected tags and/or policies can be made public and transmitted from the routing platform 102 to the network data store(s) 109. Other administrators can utilize the tags and/or policies to facilitate access control via their routing platforms (not shown).

In one aspect, destination 105 can comprise an IoT device that is a set of one or more IoT resources. Similar to the above, IoT destinations can be tagged (grouped) and can be associated with administrator-defined access control policies. For example, the destination 105 can be tagged as a "high energy consuming device," "outdoor switches," "kitchen appliances," etc. In one example, a user that owns more than one IoT device can tag IoT destinations from geographically separate locations under a common tag. Each IoT device has a policy configuration data that controls what the source 103 can access. For example, consider an example scenario wherein an administrator has two properties in two different cities, San Francisco and Seattle. The administrator can creates a configuration via a routing platform (e.g., routing platform 102) deployed in his home in Seattle, for example, 00000000,light,PORTA:0,A, default,garage,property lights, to configure an IoT resource named "light" in the "garage" controlled by a relay connected to "PORTA:0" on a micro control unit (MCU) (e.g., AT1280 MCU) using the nRF driver (00000000). This relay belongs to the tag "garage" and is further globally tagged "property lights." The logical set of electrical lines it is using is "A". Further, the administrator can create another configuration via another routing platform (e.g., routing platform 102) deployed in his home in San Francisco, for example, 00000000,outdoor lights,PORTD:0 PORTA:2,D, default,lawn lighting,property lights, to configure an IoT resource "outdoor lights" connected to "PORTD:0" and "PORTA:2" on an MCU (e.g., AT1280 MCU) using the nRF driver (00000000). This relay belongs to the tag "lawn lighting" and is globally tagged "property lights." The logical set of electrical lines it is using is "D." In this example scenario, when the administrator logs in and issues the command "turn property lights off" either via an interface associated with the routing platforms, the command message is provided to all involved devices (e.g., determined by a network/could device). After the command message is authorized the devices take the appropriate action and turn the corresponding IoT resources off. In one example, the routing platforms can communicate with the IoT devices by employing an over-the-air protocol that translates the command messages to a packet(s) and relays them to the physical receiving radio of the IoT device that executes the command locally.

Figure 1B:
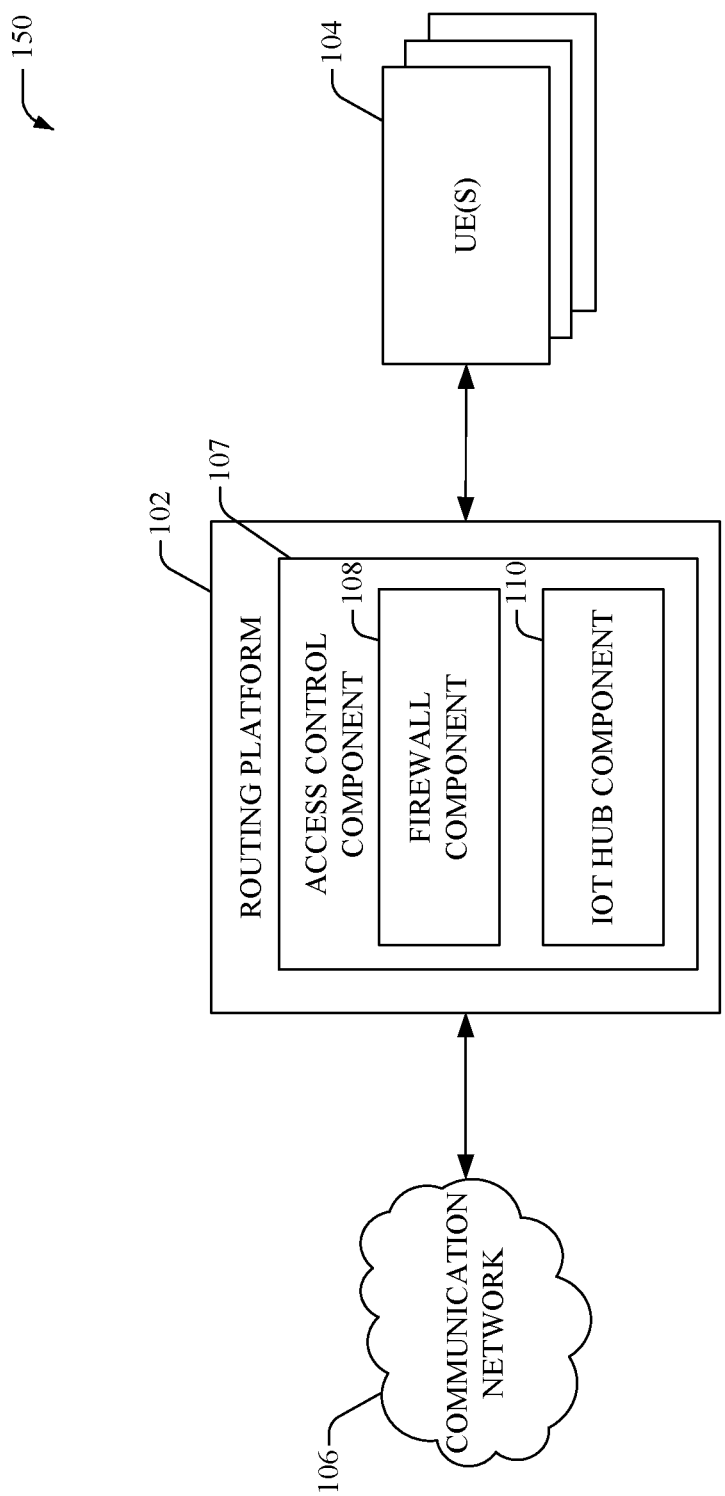

FIG. 1B illustrates an example system 150 that comprises a router platform application for implementing access control and/or device management, according to one or more aspects of the disclosed subject matter. System 150 comprises a routing platform 102 that couples UEs 104 of a wireless (and/or wired) local area network (LAN) (e.g., home Wi-Fi network) to devices of a communication network 106 that is external to the LAN. In one aspect, system 150 provide a user-friendly interface to enable users to easily identify all the UE(s) 104 currently coupled to the LAN and/or the entities (e.g., web servers of communication network 106) to which the UE(s) 104 are connected and implement policies to prevent connection to malicious and/or restricted entities. It is noted that the routing platform 102 and the access control component 107 can comprise functionality as more fully described herein, for example, as described above with regard to system 100.

The routing platform 102 directs data between one or more UE(s) 104 and the communication network 106, such as, but not limited to the Internet. As an example, routing platform 102 can comprise a Wi-Fi router that connects to the UE(s) 104 via wireless links. A UE(s) 104 can comprise most any electronic communication device such as, but not limited to, most any consumer electronic device, for example, a tablet computer, a digital media player, a digital camera, a cellular phone, a personal computer, a personal digital assistant (PDA), a smart phone, a laptop, a wearable device (e.g., smart watch, connected glasses, wrist monitor, etc.), a gaming system, smart televisions, a connected car, at least partially automated vehicles (e.g., drones), a machine-to-machine (M2M) and/or IoT device, etc. It is noted that the UE(s) 104 can be mobile, have limited mobility and/or be stationary. Further, although the subject specification describes Wi-Fi routers and/or home LANs, it is noted that the subject specification is not that limited and that most any communication technology—wired and/or wireless, can be utilized to couple to the UE(s) 104.

In one aspect, the access control component 107 can be embodied via various component, such as, but not limited to a firewall component 108 and an Internet of Things (IoT) hub component 110. As an example, the firewall component 108 can be employed to facilitate access control, for example, restrict access to particular websites, and limit access by a certain device, etc. Moreover, the firewall component 108 can monitor UE(s) 104 that are currently coupled to the routing platform 102 and/or that are actively communicating with devices of the communication network 106. Further, the firewall component 108 can determine a list of network devices (e.g., web servers, application servers, content providers, etc.), to which the UE(s) 104 are currently coupled. The firewall component 108 enables a user to select (e.g., via a simplified user interface described more in detail with respect to FIG. 2) one or more devices and/or websites and block access to the selected devices and/or websites. Further, firewall component 108 employs user-defined policies to dynamically limit access to a group of devices and/or websites. Furthermore, the IoT hub component 110 can be employed to send commands to IoT devices, such as but not limited to, relays, sensors, sub controllers, etc. This configuration provides an extensible way of driving different ecosystems via a common hub. In one aspect, the routing platform 102 can be accessed via an input interface (e.g., microphone that receives voice commands, touch screen, keypad, etc.) of the device itself or can be accessed via an application installed on, or accessed via, a UE (e.g., UE(s) 104).

With a traditional firewall paradigm, destination devices exist either inside or external to the firewall and a static policy limits external sources from accessing destinations inside and vice versa. Stateful firewalls attempt to inspect content; however, content inspection either slows down the device or may not be possible at all due to an increasing number of servers providing end to end encryption (e.g., man in the middle (MITM) proxies and HTTP Strict Transport Security (HSTS)). In contrast, systems 100 and 150 provide access control wherein the firewall paradigm shifts to a paradigm where the physical location of destinations and/or sources is irrelevant since access control policy(ies) is managed on a global scale through correlation. The access control component 107 can utilize various information associated with a communication, such as but not limited to, domain information, tags, and/or peer assigned criteria to make correlations over thousands of destinations. These correlations can be leveraged to implement policy. In one example, the routing platform 102 can be considered less of a keeper of the zone (e.g., external, de-materialized, trusted) but instead a proxy enabler of a global policy. According to an embodiment, the access control component 107 can perform correlation based on a match function applied by analyzing DNS resource records, tags, and/or relative criteria data.

As an example consider the following commands issued by an administrator of the routing platform 102: (i) "tag yahoo as favorite sites"; (ii) "tag google as favorite sites"; (iii) "block kids from favorite sites." In this example, the first command instructs the routing platform 102 to create a tag named "favorite sites." The routing platform 102 saves "yahoo" as a "match" resulting in a tag record on the match "yahoo" (e.g., a row in a match tag table). The routing platform 102 can compare all DNS resource record with the "match" and any of the DNS records that match (fully or partially) "yahoo" can be filtered according to a configured policy. Further, on receiving the second command, the routing platform 102 adds "google" to the same tag "favorite sites," for example, by adding a row in the match tag table. When a policy is applied as a result from the third command, the routing platform 102 can correlate an address (e.g., internet protocol (IP) address) of the DNS record to the tag and block the address by adding it to the "deny" IP set in the firewall component 108. Similarly, policies can be created on plain "match" (e.g., "block kids from yahoo") or "criteria" (e.g., block kids from sites inappropriate for 14 and over). It is noted that the subject specification is not limited to the above examples and that most any tags and/or criteria can be created and/or implemented.

In an aspect, the access control component 107 can analyze stored configuration data and employ algorithms and/or web crawling to map equivalence between records. For example, if a destination at domain "VDO.com" has been tagged as "video" to enforce policy by an administrator and characterized as "adult content." The access control component 107 can search for similar tags belonging to other sites (e.g., "adult-video.com" and "Rated R"), for example, from the network data store(s) 109, make a determination that the two are very similar (or related) and offer suggestions to the administrator. Since tags are available to the community through the network data store(s) 109, the tags may involve very large sets. To restrict (or filter) the sets, the system can suggest existing tags to coalesce domains and/or also include the information of the person who created the tag with a digital signature.

Additionally, access policies can be defined and/or implemented (via the access control component 107) based on criteria values. As an example, a criteria can comprise a value in the network data store(s) 109 that is surveyed from the broader community. For example, a criteria table could be defined as:

TABLE 1

| resource_id | criteria_value | criteria_name |
|---|---|---|
| youtube | ****** | age 14 and below |
| youtube | *** | addiction rating |

As an example, the administrator can issue a command (e.g., via an interface of the routing platform 102) to define a policy that utilizes the criteria value, such as but not limited to, "block kids from addiction rating sites with 3 stars or more." In this example scenario, the access control component 107 can correlate requests from sources tagged as "kids" that match the criteria and block destinations according to the policy issued in the command.

According to an aspect, at least a portion of the systems disclosed herein can reside within a network, for example, a cloud. It is noted that the term "cloud" as used herein can refer to a set of servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud computing environment can include multiple layers, aggregated together, that interact with each other to provide resources for end-users. As an example, a cloud can include resources (e.g., processing resource(s), data storage resource(s), etc.) that can reside on-premise or off-premise at a service provider location. Moreover, the cloud can be, but is not limited to, a public cloud, a private cloud, an inter-cloud, or a hybrid cloud.

Figure 2:
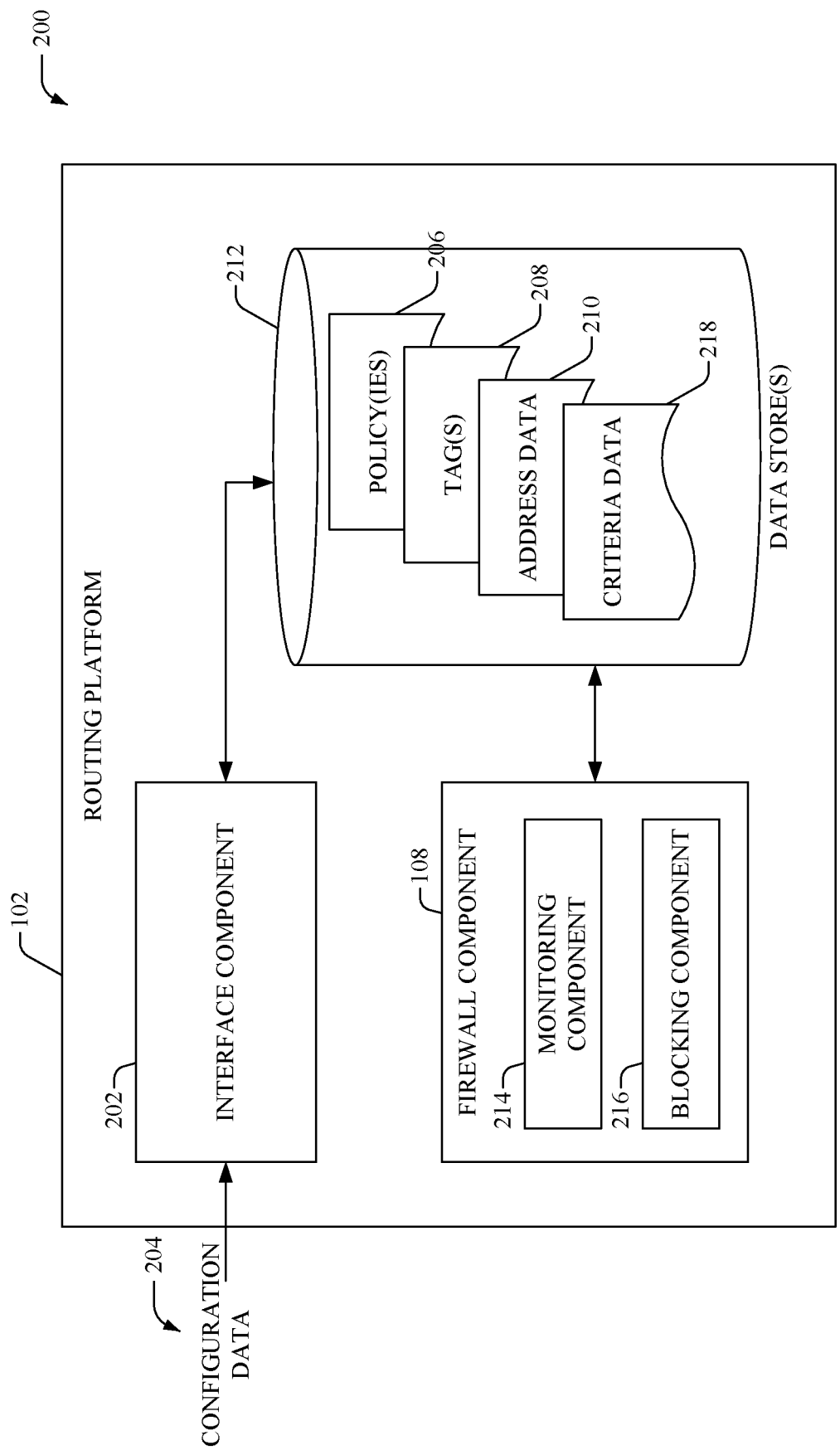
FIG. 2 illustrates an example system for configuration of a routing platform.

Referring now to FIG. 2, there illustrated is an example system 200 for configuration of a routing platform, in accordance with an aspect of the subject disclosure. It is noted that the routing platform 102 and the firewall component 108 can comprise functionality as more fully described herein, for example, as described above with regard to systems 100 and 150. In one aspect, an interface component 202 can be utilized to receive configuration data 204. As an example, the interface component 202 can provide a user-friendly graphical user interface (GUI) to facilitate reception of user instructions. It is noted that although a GUI is describes herein, interface component 202 can comprise most any input/output interface, such as, but not limited to an audio interface (e.g., a microphone that receives voice commands), a video interface (e.g., a camera that receives gesture commands), etc. Typically, the configuration data 204 can be received from an authorized device (e.g., network administrator). As an example, the routing platform 102 can request and verify credential data (e.g., username, passwords, identifiers, etc.) from the authorized device prior to receiving the configuration data 204.

According to an embodiment, the configuration data 204 can include access policies 206 for restricting access to/by specific devices, tags 208 that link devices/websites to a group, and/or address data 210 (e.g., Internet Protocol (IP) address of malicious/inappropriate websites), etc., that can be stored in a data store(s) 212. As an example, the tags 208 can include tags that classify source host names and their Internet addresses (e.g., "tag Jack as screen addict," "tag John as full time employees," etc.), and/or tags that classify destination DNS name "matches" into groups (e.g., "tag google as search," "tag google as email," "tag slither.io as gaming sites," etc.). Access policies 206 can comprise policies to prohibit communications based on source and destination matches (e.g., "block user@Jacks-Iphone from minecraft," "block full time employees from SocialMedia," etc.) and/or policies to allow exceptions to communications (e.g., block screen addict from gaming sites except math games). Further, a monitoring component 214 can track communication routed through the routing platform 102 and compare the communication data (e.g., source address, destination address, etc.) to the information stored in data store 212. Furthermore, a blocking component 216 can implement one or more of the policies 206 that apply to the communication data.

In one example, the configuration data 204 can include an instruction "tag <username> as kids." This associates the user/device named "username" to the group named "kids" and enables configuration/implementation of a group policy (e.g., received via the interface component 202), for example, "block kids from evilsite." In this example scenario, the monitoring component 214 can track communication routed through the routing platform 102 and the blocking component 216 can block members (e.g., devices and/or users) of the group "kids" from accessing a website matching "evilsite" (e.g., www.evilsite.com and/or games.evilsite.com). In another example, the configuration data 204 can include instructions to classify/tag websites, such as, but not limited to, "tag google as search," "tag google as social media." This places all websites matching "google" into two categories ("social media" and "search") and enables configuration/implementation of a group policies (e.g., received via the interface component 202), for example, "block kids from social media" and/or "block kids from social media from 9.00 am to 8.30 pm," etc. In this example scenario, the blocking component 216 can block members (e.g., devices and/or users) of the group "kids" from accessing all websites classified as "social media."

According to an embodiment, the routing platform 102 can detect updates to the address data 210 that comprises source or destination addresses (e.g., IP addresses) employed in the access policies 206. For example, the updates can be received from one or more network devices (e.g., DNS servers) at most any time, for example, periodically, on-demand, at a specified time, in response to an event, etc. Accordingly, system 200 can automatically and dynamically block matches and/or tags without creating static policies for each website.

In one aspect, the configuration data 204 can further include criteria data 218 that can comprise metadata for a tag that provide administrators with additional information related to the tag that be utilized to easily identify relevant/valuable public tags. As an example, the criteria data 218 can comprise, but is not limited to, most any value, rating, ranking, reviews, scales, and the like. For example, an administrator can tag "anatomy" as an "educational resource". However, this tag may not be appropriate for kids under 10 years of age. Accordingly, the administrator can assign, to the tag, a criteria "kids over 10 yrs" with a high rating (or a low rating for a criteria "kids under 10 yrs").

It is noted that the data store(s) 212 can include volatile memory(s) or nonvolatile memory(s), or can include both volatile and nonvolatile memory(s). Examples of suitable types of volatile and non-volatile memory are described below with reference to FIG. 15. The memory (e.g., data stores, databases) of the subject systems and methods is intended to include, without being limited to, these and any other suitable types of memory. Although FIG. 2 depicts the data store(s) 212 residing within the routing platform 102, the subject specification is not that limited and the data store(s) 212 can be externally coupled to the routing platform 102.

Figure 3A:
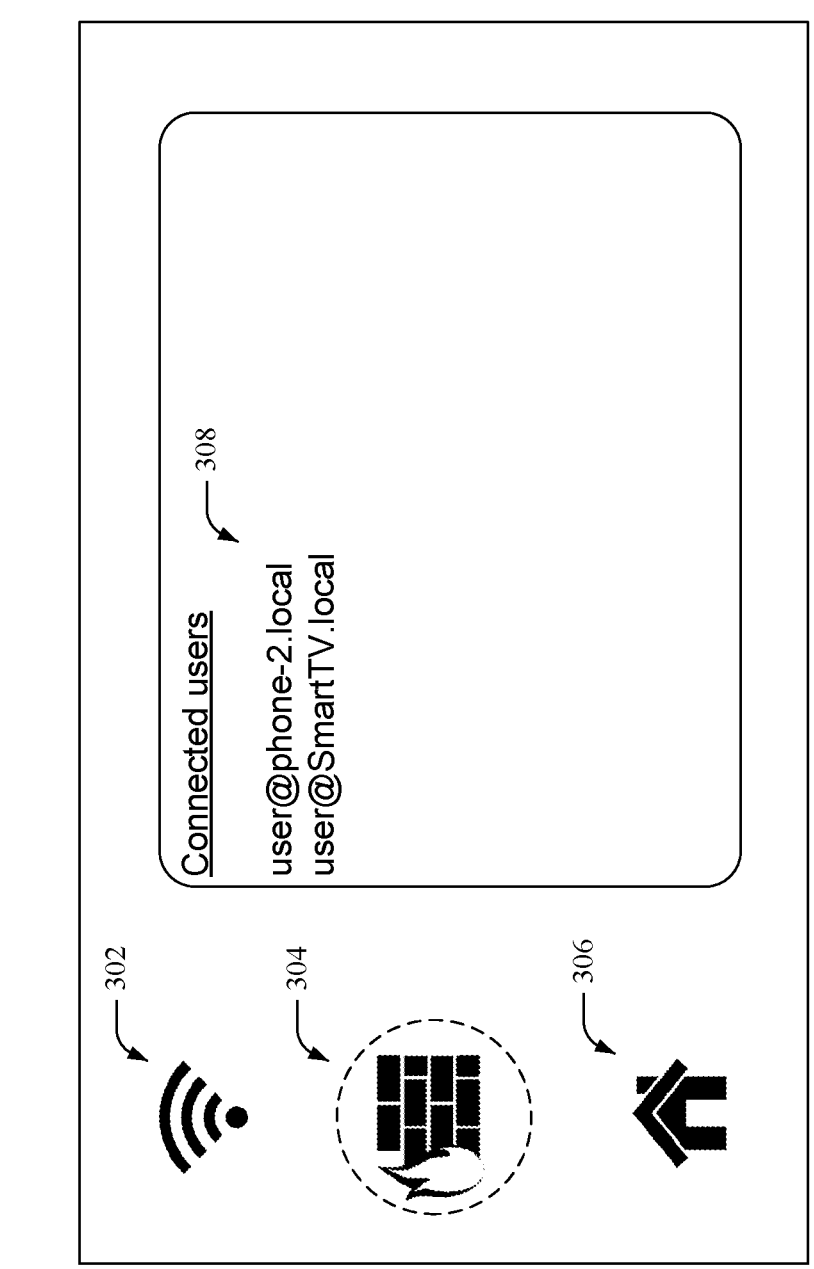
FIGS. 3A-3C illustrate example graphical user interfaces (GUIs) for managing firewall operations of a router.
Figure 3B:
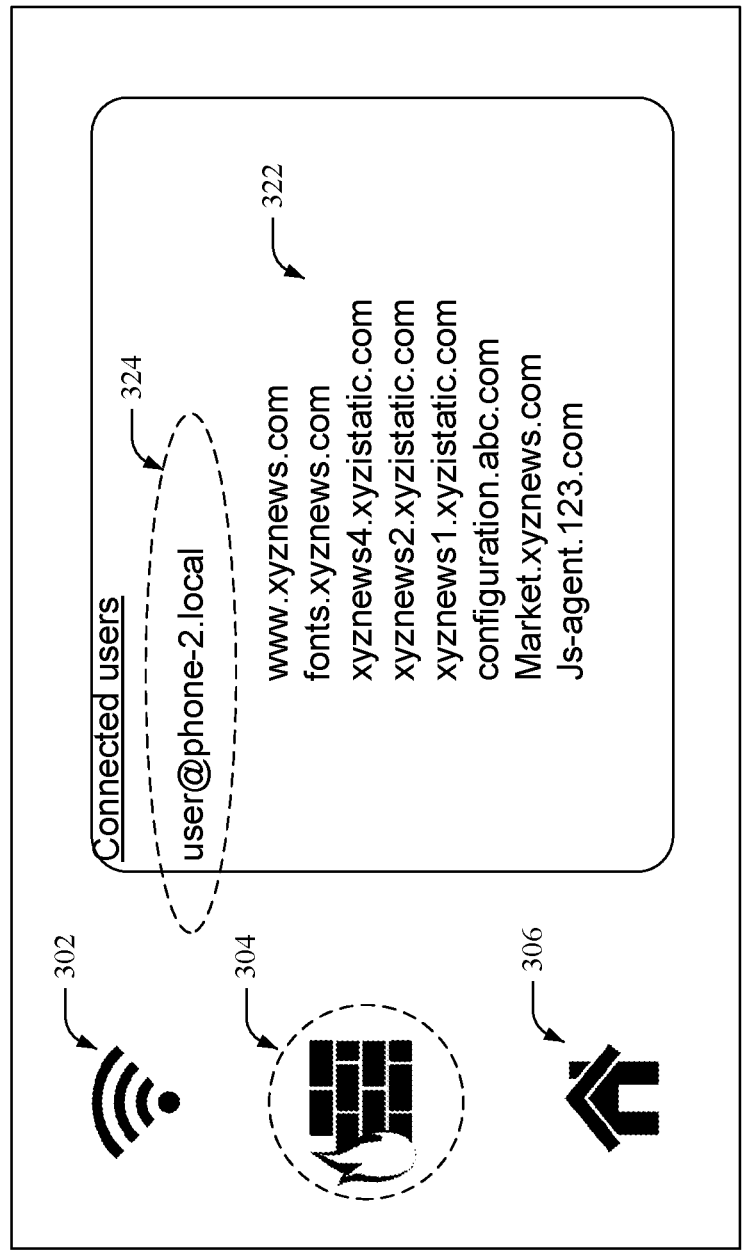
Figure 3C:
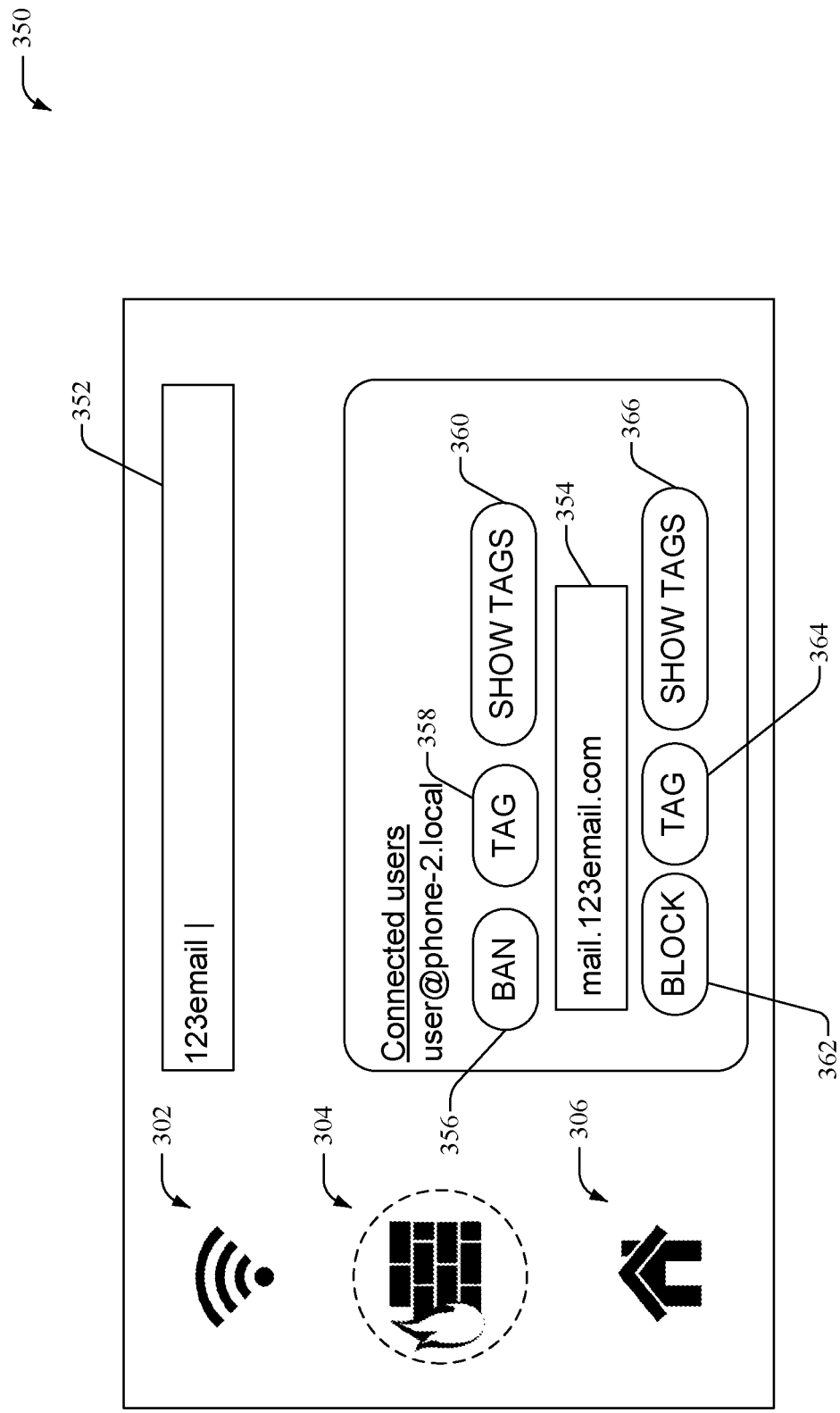

FIGS. 3A-3C illustrate example GUIs (300, 320, 350) for managing firewall operations of a router (e.g., routing platform 102), according to an aspect of the disclosure. In one aspect, GUIs 300-350 can be employed by or embody interface component 202 to facilitate user interaction. It is noted that the GUIs depicted herein can include a plurality of related images and interface objects or elements to facilitate management of routing, firewall and/or IoT hub parameters and/or other options. For example, an interface object can include any combination of, among other things, text, text boxes, drop down menus, checkboxes, and buttons which can be interacted with utilizing one or more of a pointing device (e.g., stylus, mouse, trackball, touchpad . . . ), keyword, or voice activated software. It should be noted, however, that these illustrations are provided by way of example and not limitation. As one of skill in the art can appreciate, there is a plethora of ways to arrange and present objects and text of graphical user interfaces. The depicted GUIs illustrate only one such arrangement and are presented for purposes of clarity and understanding and not to limit the scope of the subject specification to that which is disclosed.

Referring back to FIG. 3A, GUI 300 depicts icons (302, 304, and 306) for wireless signal management, firewall management, and IoT device management. In one aspect, if the firewall management icon 304 is selected (e.g., as depicted by the dotted lines), a list of connected UEs 308 (e.g., source addresses such as user@phone-2.local, user@SmartTV.local, etc.) can be displayed. FIG. 3B depicts a list of all the websites 322 (e.g., www.xyznews.com, fonts.xyznews.com, xyznews4.xyzistatic.com, xyznews2.xyzistatic.com, xyznews1.xyzistatic.com, configuration.abc.com, market.xyznews.com, Js-agent.123.com, etc.) that a selected UE 324 (e.g., user@phone-2.local) is connected to. As an example, the list of connected user and/or websites being accessed can be determined by the monitoring component 214. Further, FIG. 3C depicts a search bar 352 that can be employed to filter the list of UEs (e.g., UEs 308) and/or websites (e.g., websites 322). In one example scenario, on entering "123email" in the search bar 352, matching websites, such as, "mail.123email.com" can be displayed. In one aspect, an option to ban/block the UE (e.g., user@phone-2.local) from accessing a communication network (e.g., communication network 106) can be provided by the "BAN" button 356. In addition, an option to tag the UE (e.g., user@phone-2.local) to assign the UE to a group can be provided by the "TAG" button 358. Further, on selecting the "SHOW TAGS" button 360, a list of tags assigned to the UE (e.g., user@phone-2.local) can be displayed (e.g., within a new screen or a pop-up screen). Similarly, buttons "BLOCK" 362, "TAG" 364, and "SHOW TAGS" 366 can be employed to block access to, tag, and display tags associated with a selected website 354 (e.g., mail.123email.com) respectively.

Figure 4:
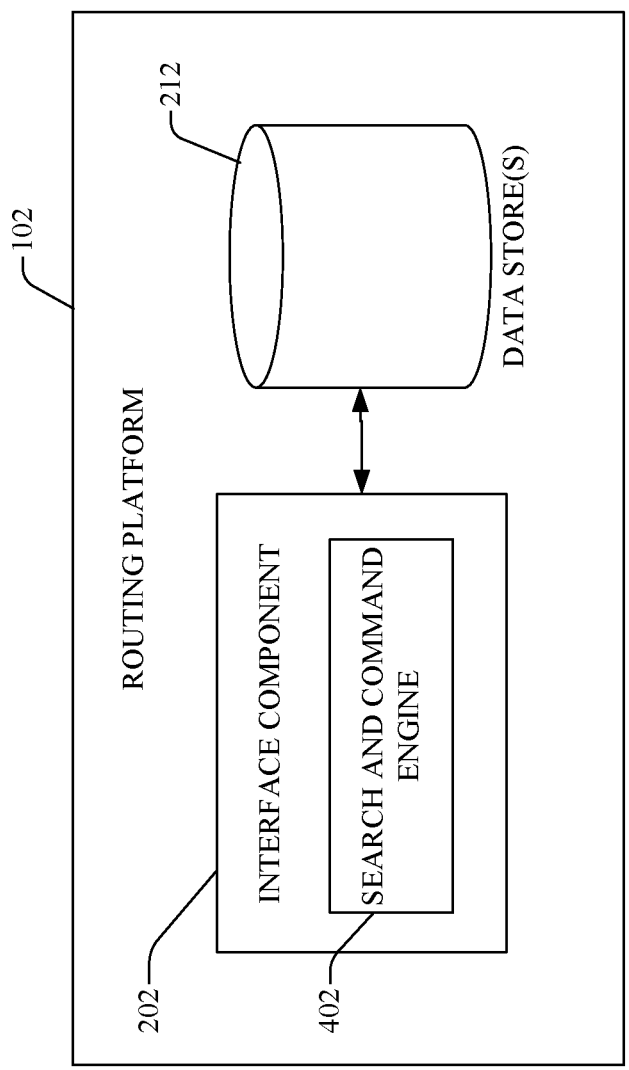
FIG. 4 illustrates an example system that employs a search and command interface for text entry.

Referring now to FIG. 4, there illustrated is an example system 400 that employs a search and command interface for text entry, according to an aspect of the subject disclosure. It is noted that the routing platform 102, the interface component 202, and the data store(s) 212 can comprise functionality as more fully described herein, for example, as described above with regard to systems 100-200.

According to an embodiment, a search and command engine 402 can be utilized to provide a search and command interface that can input instructions from a user. In one example, the search and command engine 402 can predict text and/or instructions that are likely to be input by a user. Moreover, the search and command engine 402 facilitates entry of input data by suggesting one or more words that a user can insert in a search bar (e.g., search bar 352 or other text entry object). As an example, the one or more words can be determined based on the context of other words/letters typed by the user and/or available and/or appropriate actions/commands. In one aspect, the search and command engine 402 can build a stack to predict a user's intention and/or goal in the context of a feature that is currently being utilized. After analyzing the stack, if the command is implemented, the search and command engine 402 can issue the command and the appropriate action can be performed (e.g., by the firewall component 108 and/or the IoT hub component 110). The search and command engine 402 can store, within data store(s) 212, a set of keywords corresponding to resources (e.g., DNS entries and/or IoT resources). When a policy is added, the search and command engine 402 can also adds tags, matches, and/or other keywords to the keyword set so that they can be presented to a user interacting with the system. It is noted that the subject system is not limited to the above the search and command feature, and that the user interface can additionally or alternatively present simple buttons to facilitate command entry and/or platform management.

In one example, the search and command engine 402 can present the user with appropriate and/or available instructions based on user input. In addition, the search and command engine 402 can process natural language searches and/or execute natural language commands. For example, in an email application, the search and command engine 402 can receive instructions such as "mark email from *trolling.net as spam" to place all emails from senders with "trolling.net" in their email address in a spam folder; "tag email from the wife as important" to mark as important all emails from a user tagged as "wife"; "delete email from trash" to delete all emails in the trash folder; etc. In another example, for a smartphone application, the search and command engine 402 can receive instructions such as "play dire straits on radio," "play dire straits on music app," "make a reservation at Elm Roasters at 2.00 pm on Nov. 26, 2015," etc. In one aspect, applications installed on and/or executed via UEs coupled to the routing platform 102 can register commands that they support. For example, the application for a bus schedule can register a "ping" command (e.g., that pings the user at a preset time before arrival of a bus) with the search and command engine 402.

According to an aspect, the search and command engine 402 can present interactive dialogs to a user, should the command entered by the user be restricted. For example, if determined that the command "block evilwebsite" entered requires "administrator" or other role based access control (RBAC) privileges, the search and command engine 402 can present one or more authentication pages as configured to receive credentials or other authentication data prior to execution of the commands.

Figure 5A:
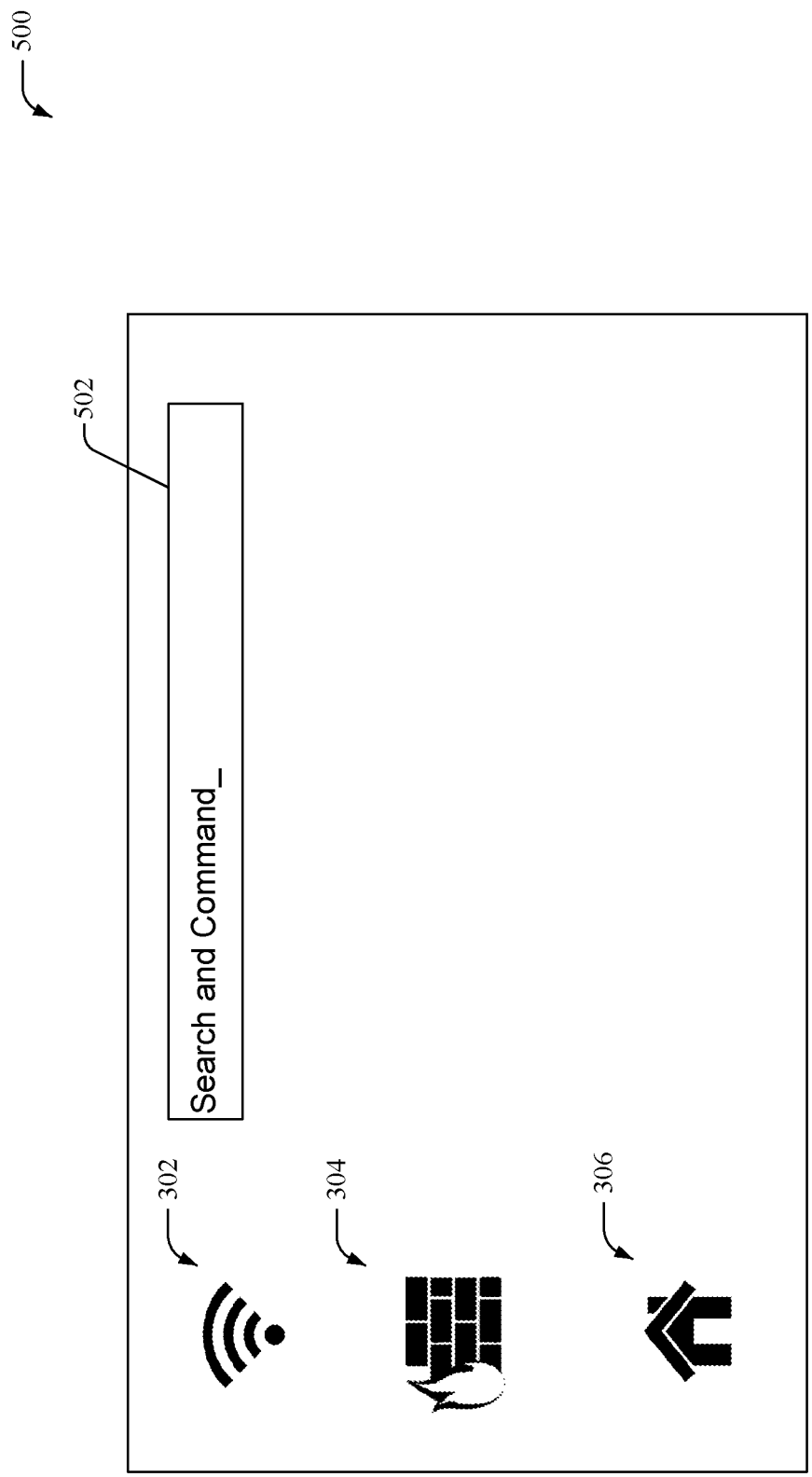
FIGS. 5A-5C illustrate example GUIs for input of search and command parameters.
Figure 5B:
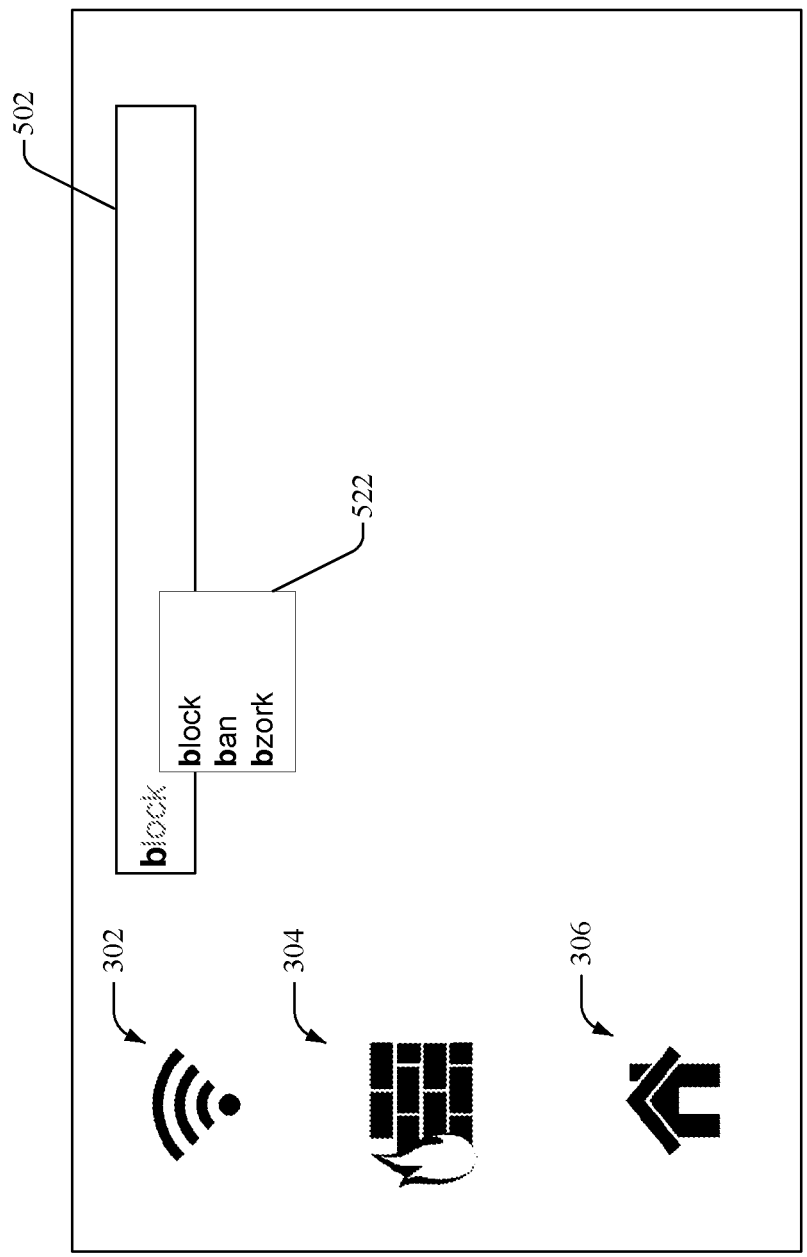
Figure 5C:
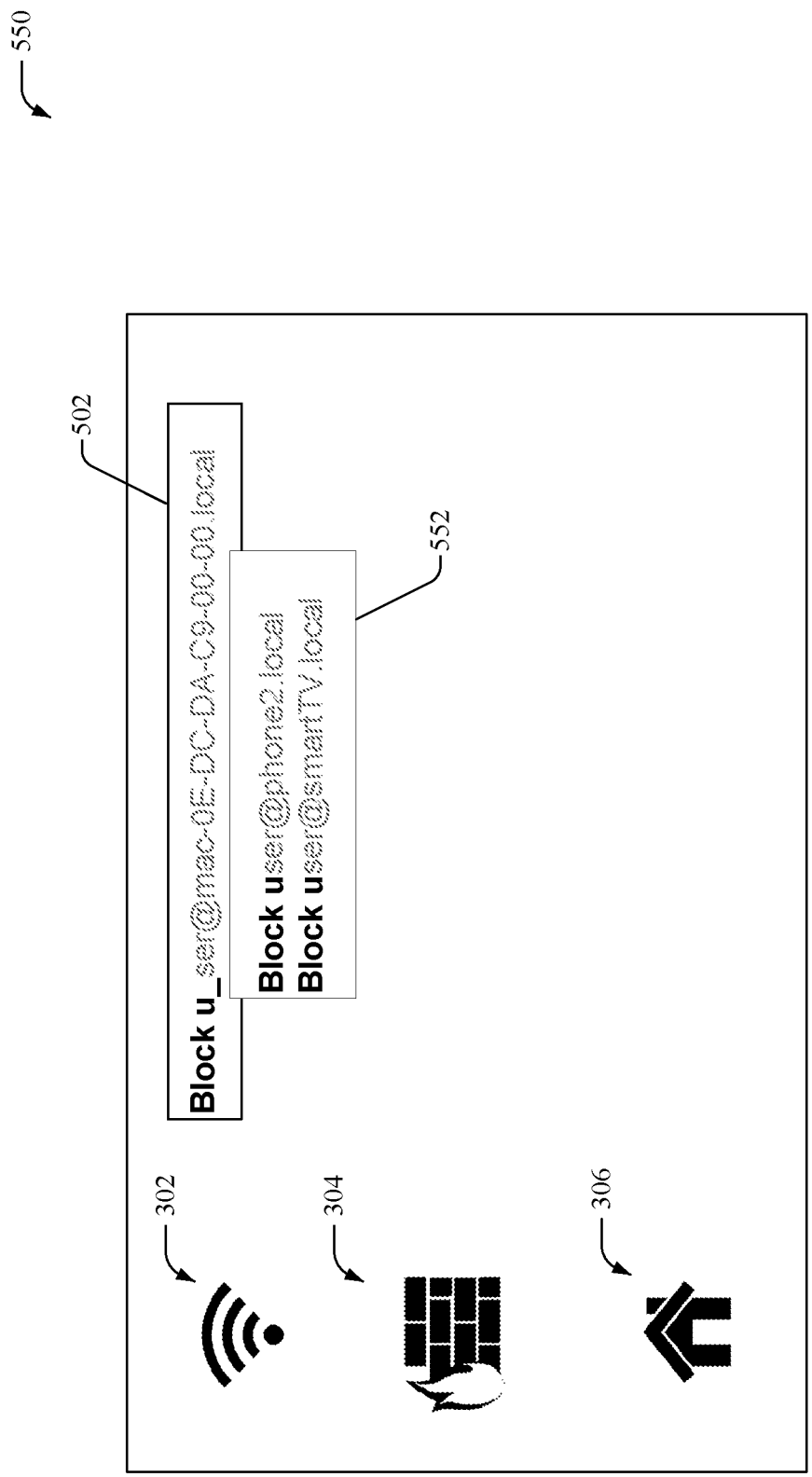

FIGS. 5A-5C illustrate example GUIs (500, 520, 550) for input of search and command parameters, according to an aspect of the disclosure. In one aspect, GUIs 500-550 can be employed by or embody interface component 202 to facilitate user interaction with the routing platform 102. GUI 500 depicts a search and command bar 502 that can be utilized by the user to enter queries and/or commands. GUI 520 depicts an example window that presents potential actions as well as search matches based on the user entered text. For example, as the user/administrator types "b," a list of commands (e.g., block, ban, etc.), usernames (e.g., bzork), search keywords and/or any other appropriate text suggestions (e.g., block, ban, etc.) to complete the text entry can be presented to the user at 522. When the desired option (search item and/or command) is chosen a next option 522 (e.g., Block user@mac-0E-DC-DA-C9-00-00.local, Block user@phone2.local, Block user@smartTV.local, etc.) can be dynamically presented based on earlier input, as illustrated in GUI 550.

Figure 6:
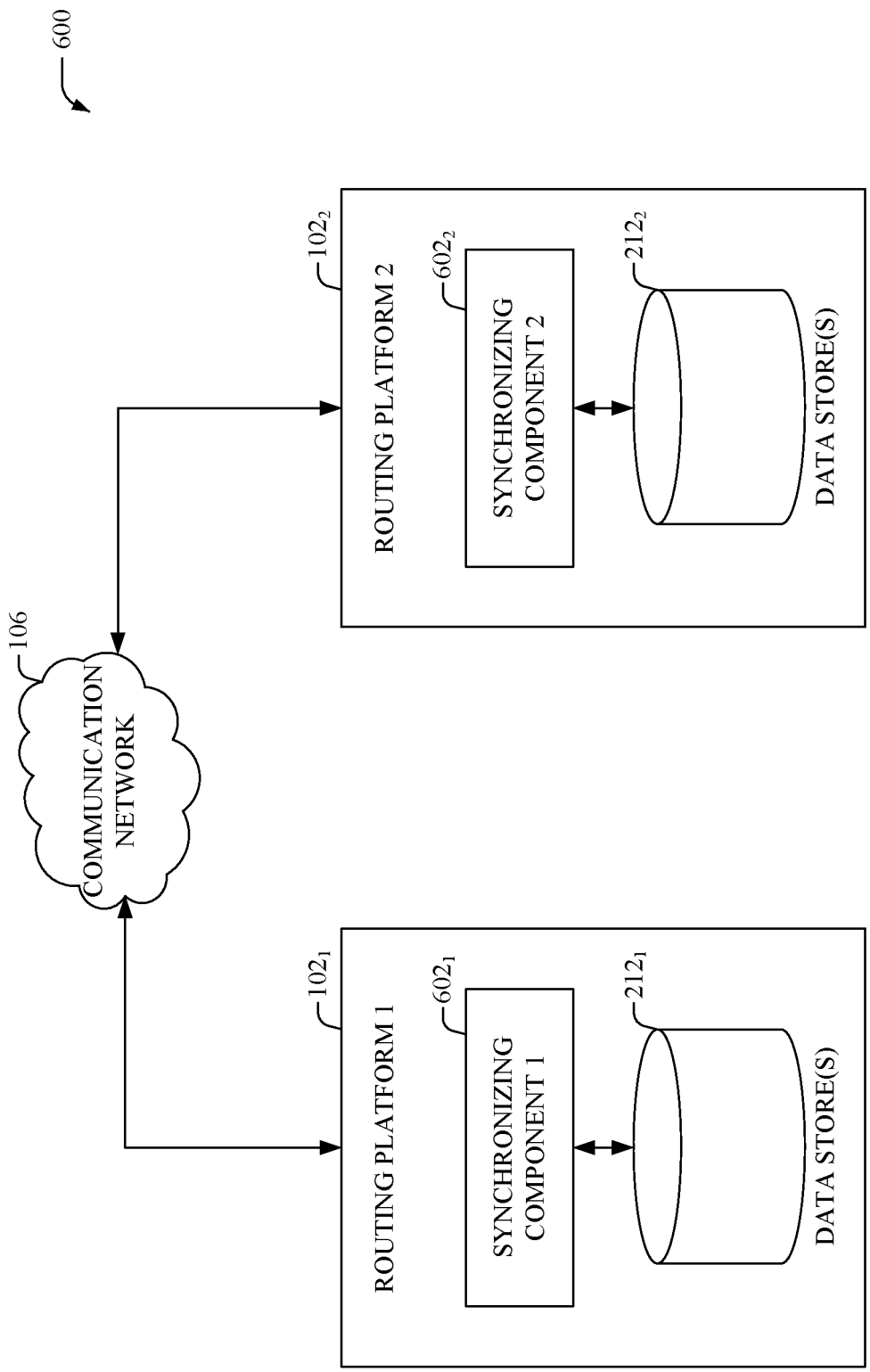
FIG. 6 illustrates an example system that facilitates publishing of configuration data.

FIG. 6 illustrates an example system 600 that facilitates publishing of configuration data, according to aspects of the disclosed subject matter. The routing platforms 1-2 (102$_1$-102$_2$) can be substantially similar to routing platform 102 and comprise functionality as more fully described herein, for example, as described herein with regard to routing platform 102. Further, the data store(s) 212$_1$-212$_2$ can be substantially similar to data store(s) 212 and comprise functionality as more fully described herein, for example, as described herein with regard to data store(s) 212. In one aspect, selected (e.g., marked as public) configuration data, for example, tags, policies, criteria data, and/or resources, etc., stored within data store(s) $212_1$-$212_2$ can be published to a network data store 109 of the communication network 106, for example, by employing publishing components 1-2 ($602_1$-$602_2$). Additionally or alternatively, the selected configuration data stored within data store(s) $212_1$-$212_2$ can be synchronized with each other. For example, publishing component 1 ($602_1$) can direct to a network data store 109 (e.g., cloud storage) of the communication network 106, public tags, criteria data, and/or policies configured by an administrator of the routing platform 1 ($102_1$). As an example, the administrator can provide authorization for sharing and/or synchronization of the data (or portion of data) stored in data store(s) $212_1$. In one aspect, an administrator of the routing platform 2 ($102_2$) can import the data from the network data store (e.g., via the publishing component 2 ($602_2$)) to aid in creating local policies. It is noted that the data stored in data store(s) $212_1$-$212_2$ and/or the network data store can be updated (e.g., periodically, at a specified time, on-demand, in response to an event, etc.), for example, if determined that addresses (e.g., source and/or destination IP addresses) have changed.

As an example, a first administrator of the routing platform 1 ($102_1$) can configure the routing platform 2 ($102_2$) to block websites tagged as "document sharing" and instruct the publishing component 1 ($602_1$) to update this information to the network data store. Further, a second administrator from a remote branch office can import this policy via the routing platform 2 ($102_2$) deployed at a remote office (e.g., via the publishing component 2 ($602_2$)). The IP addresses corresponding to the websites are automatically updated by the routing platform 2 even though they might resolve to potentially different IP addresses of cache servers.

In one aspect, the administrators can review the tags and/or policies stored in the network data store 109 and add or update criteria data that provides relevant criteria wherein the tag and/or policies are most appropriate. As an example, the first administrator of the routing platform 1 ($102_1$) can configure the routing platform 2 ($102_2$) to tag an anatomy website "anatomy.com" as a "kids learning" category. The second administrator can access this tag via routing platform 2 ($102_2$) and can add appropriate criteria data (e.g., appropriate for kids over 10 yrs). In other example embodiments, the second administrator can flag the tag as inaccurate or incorrect via the criteria data. A network server of the communication network 106 can aggregate reviews and/or feedback from several administrators to generate an aggregated information (e.g., value, rank and/or rating) for the public tags and/or policies stored in network data store 109. Although only two routing platforms $102_1$-$102_2$ are depicted in FIG. 6, it is noted that the subject disclosure is not that limited and greater number of routing platforms can be implemented.

Figure 7:
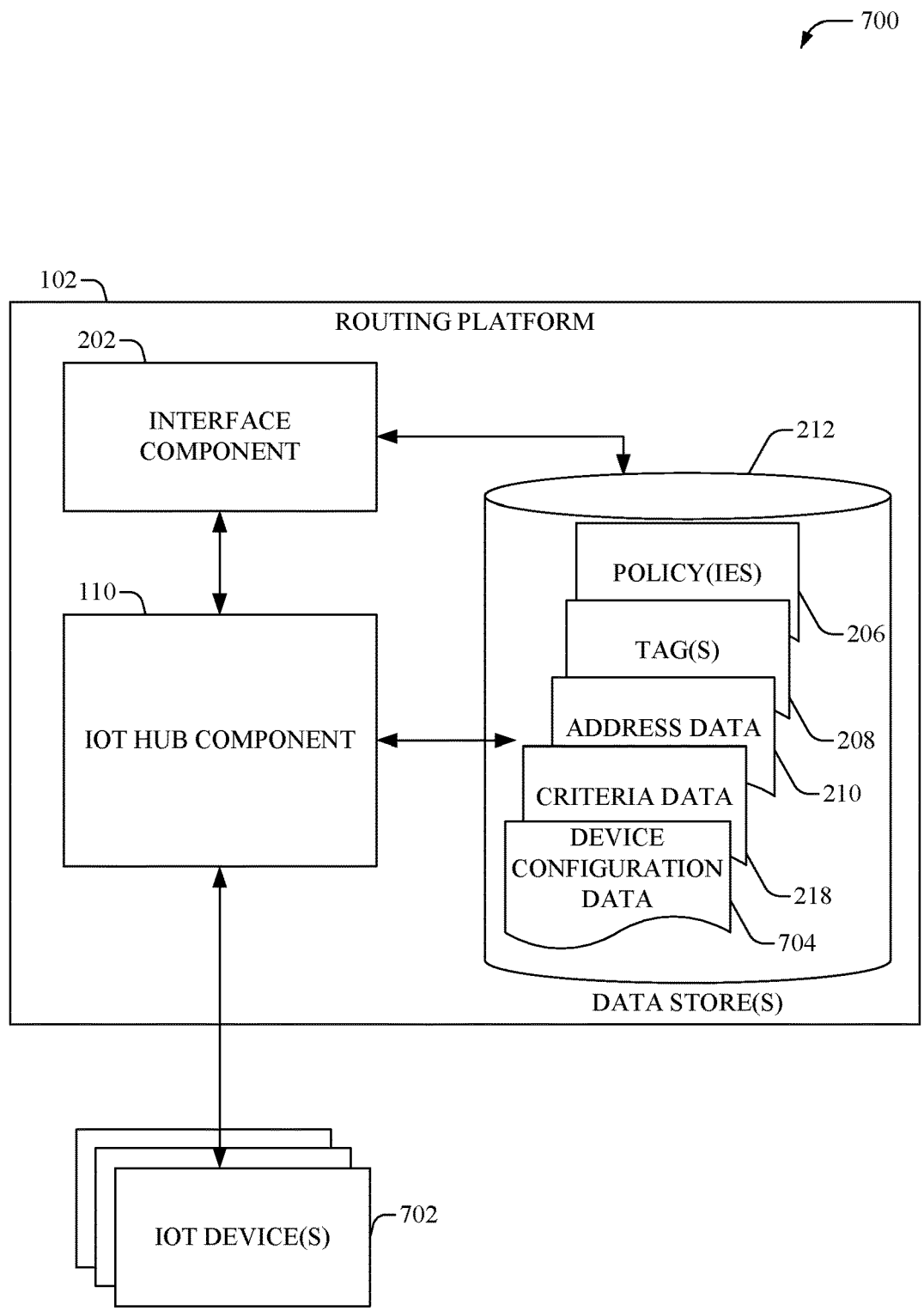
FIG. 7 illustrates an example system for management of Internet of Things (IoT) devices in accordance with the subject disclosure.

FIG. 7 illustrates an example system 700 for management of IoT devices in accordance with the subject disclosure. System 700 provides an extensible way of driving different ecosystems. It is noted that the routing platform 102, IoT hub component 110, interface component 202, and data store 212 can comprise functionality as more fully described herein, for example, as described above with regard to systems 100-200, 400, and 600. In one aspect, the routing platform 102 can send commands to IoT devices 702, such as, but not limited to relays, sensors, and/or sub controllers by employing the interface component 202 and IoT hub component 110. In one aspect, the IoT devices 702 can comprise most any physical device comprised of a set of destinations (e.g., destination 105). A source (e.g., source 103) can comprise a user and/or administrator that issues commands to the destinations via most any UE coupled to the routing platform 102.

As an example, during an initialization phase (and/or at any other time) the interface component 202 can receive device configuration data 704 associated with the IoT devices 702. The device configuration data 704 can be stored in data store(s) 212. Further, the interface component 202 can receive a command, for example, for modifying one or more operations of the IoT device(s) 704. In one aspect, the IoT hub component 110 can determine whether modification of the operation is authorized, for example, based on the access policy(ies) 206. If determined to be authorized, the IoT hub component 110 can transmit the command to the IoT device(s) 704 via an over-the-air (OTA) protocol associated with microcontroller devices, such as but not limited to, Atmega, advanced RISC machine (ARM), and/or Microchip PIC (e.g., PICAXE) chip sets. In one example, the OTA protocol can be a hardware agnostic control layer for IOT leveraging the features (e.g., search and command, correlation, criteria, and/or tagging) of the routing platform 102. In another example, the OTA protocol can include hardware specific configuration needed for wireless peer-to-peer communication.

Figure 8A:
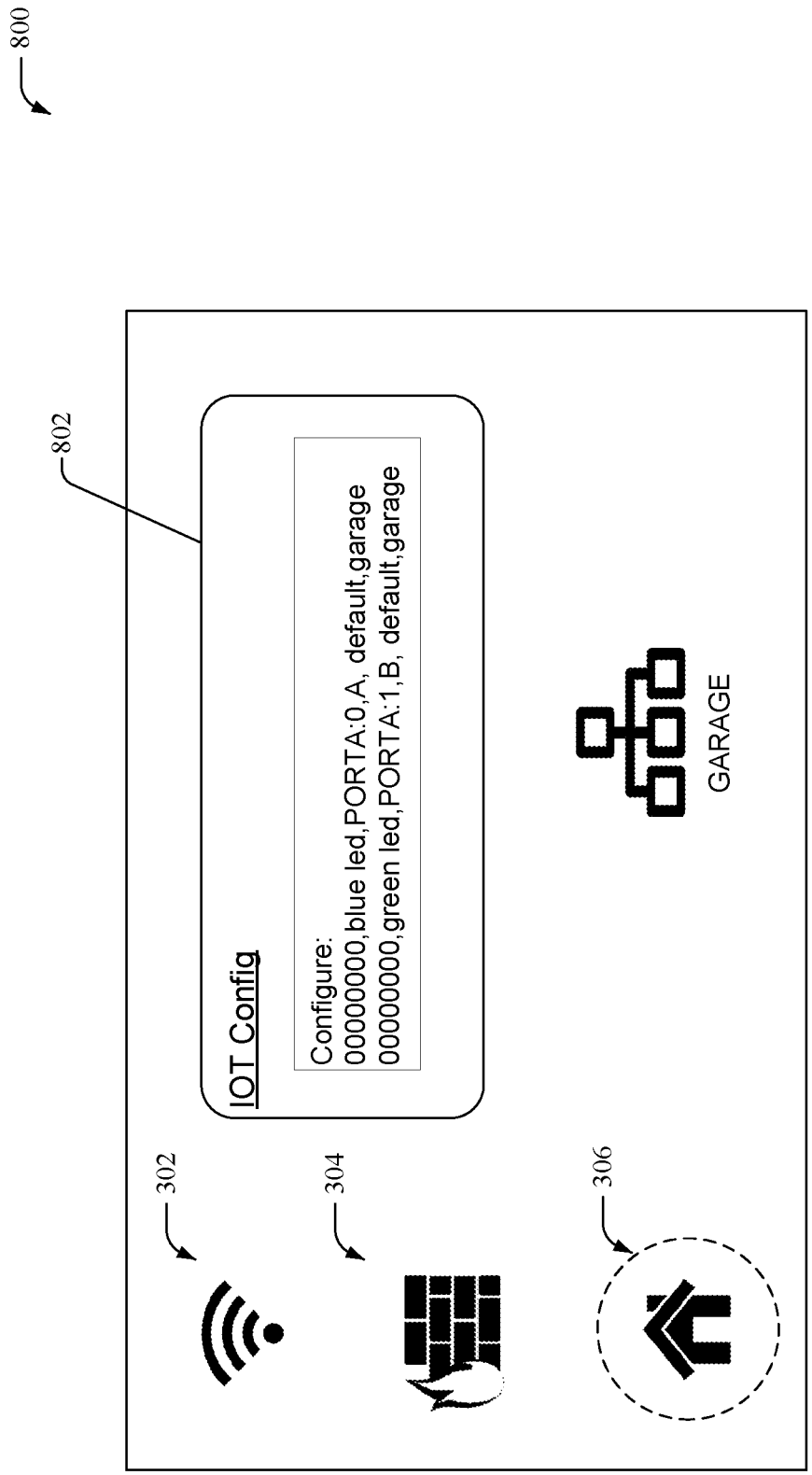
FIGS. 8A-8B illustrate example GUIs for configuration and control of IoT devices.
Figure 8B:
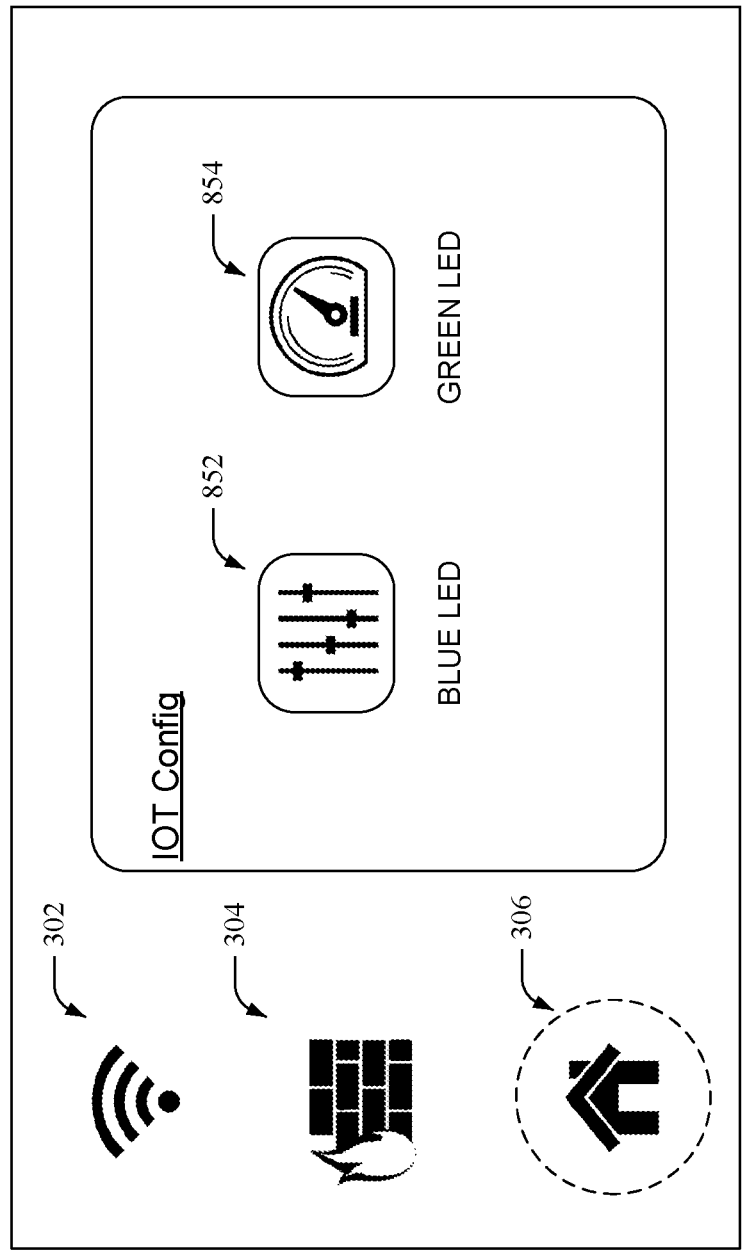

FIGS. 8A-8B illustrate example GUIs (800, 850) for configuration and control of IoT devices, according to an aspect of the disclosure. In one aspect, GUIs 800-850 can be employed by or embody interface component 202 to facilitate user interaction with the routing platform 102. GUI 800 depicts configuration of example IoT devices, grouped under "garage." For example, at 802, a blue light emitting diode (LED) and a green LED can be configured. Once configured, GUI 850 depicts icons 852 and 854 for controlling the blue and green LEDs respectively. For example, clicking on the icons 852 and/or 854 can turn the respective LEDs off or on. It is noted that although FIGS. 8A-8B depict configuration and control of LEDs, the subject specification is not limited to LEDs and most any operation of different types of IoT devices can be controlled. Further, operation of the IoT devices (e.g., blue LED and/or green LED) can be controlled by entry of commands (e.g., "turn blue LED on," "turn green LED off," "open garage door," "set living room temperature at 67 F," etc.) in the search and command bar (e.g., bar 502)

Figure 9:
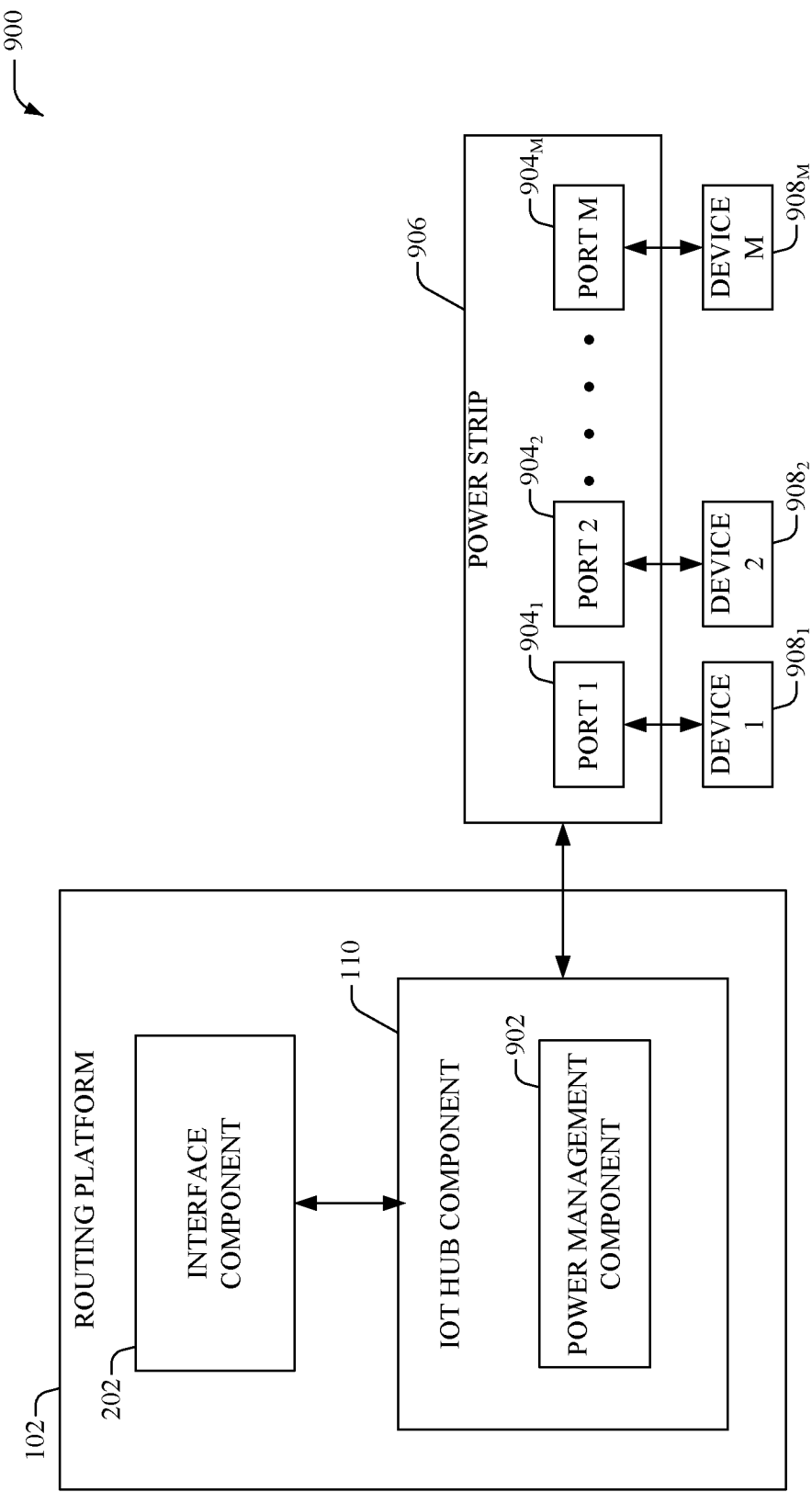
FIG. 9 illustrates an example system that controls a power strip coupled to a routing platform.

Referring now to FIG. 9, there illustrated is an example system 900 that controls a power strip coupled to a routing platform in accordance with the subject embodiments. It is noted that the routing platform 102, IoT hub component 110, and interface component 202 can comprise functionality as more fully described herein, for example, as described above with regard to systems 100-200, 400, 600, and 700. In one aspect, based on instructions received from an administrator, for example, via the interface component 202, a power management component 902 can control individual and/or groups of ports $904_1$-$904_M$ (wherein M is most any natural number) of a power strip 906.

According to an embodiment, the power strip 906 can comprise an extension block, power board, power bar, plug board, trailing gang, trailing socket, etc. that is coupled to a power source (e.g., electrical outlet) and/or comprises a power source (e.g., battery, solar panel, etc.). The power strip 906 can be coupled to the routing platform 102 via a wired and/or wireless link. As an example, the power management component 902 can transmit commands to control operation of the power strip 906 over an OTA encrypted wireless protocol. As an example, the protocol can handle relays, pulse width modulation (PWM) applications, and analog-to-digital converter (ADC) inputs and outputs (e.g., temperature measurement/control). In one aspect, the power strip can comprise power ports $904_1$-$904_M$ (e.g., sockets) that are employable to connect the power strip 906 to most any electrical equipment/device/appliance $908_1$-$908_M$ (e.g., lights, televisions, security devices, etc.). Moreover, the power ports $904_1$-$904_M$ can supply power or cut off power to the connected electrical equipment/device/appliance $908_1$-$908_M$. The power strip 905 can transmit registration information to the power management component 902 identifying the devices $908_1$-$908_M$ coupled to the respective power ports $904_1$-$904_M$. In an example scenario, the administrator can enter a command "switch lamp on" via the interface component 202 and in response, the power management component 902 can identify a corresponding port and transmit data to the power strip 906 that instructs a power port $904_1$ to supply power to a connected device 1 $908_1$ (e.g., lamp).

Figure 10:
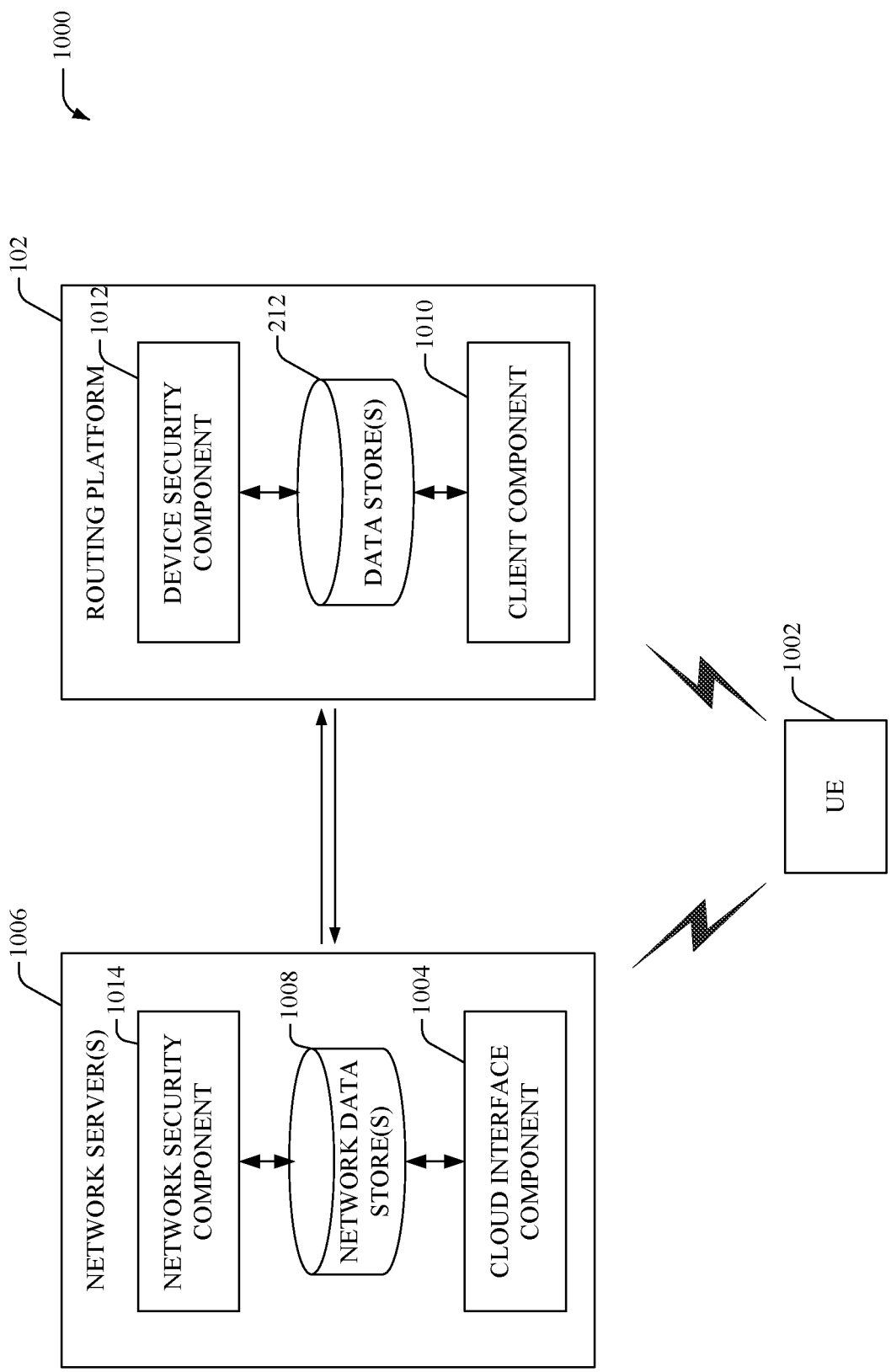
FIG. 10 illustrates an example system for network-based access to a routing platform.

FIG. 10 illustrates an example system for network-based access to a routing platform, according to aspects of the subject disclosure. According to an embodiment, an administrator can employ UE 1002 to access the routing platform 102 via an interface component 202 of the routing platform 102 and/or via a cloud interface component 1002 of network server(s) 1004. It is noted that the routing platform 102 and data store(s) 212 can comprise functionality as more fully described herein, for example, as described above with regard to systems 100-200, 400, 600, 700, and 900.

Traditional routers and embedded devices have a user interface that is only available from the routing device itself. In contrast, system 1000 employs a mechanism to operate the routing platform 102 via a user interface that has the same (or substantially similar) look and feel when operated locally or operated from the cloud. In one aspect, the UE 1002 can couple to and access the routing platform 102 over a local area network. Additionally or alternatively, the UE 1002 can couple to and access the routing platform 102 via the network server(s) 1006 that can be accessed over a wide area network (e.g., the Internet) and/or cellular network. The cloud interface component 1004 can be substantially similar to interface component 202 and comprise functionality as more fully described herein, for example, as described herein with regard to interface component 202.

According to an embodiment, instructions received from the UE 1002 via the cloud interface component 1004 can be stored within a network data store(s) 1008. In one example, the network data store(s) 1008 can comprise a read-only database that is employed to synchronize messages to the routing platform. As an example, a user can issue a command (e.g., block Jack from internet video from 6.00 PM to 8.00 PM) via the cloud interface component 1004. In response, a message can be created and/or stored within the network data store(s) 1008. The message can be read by a client component 1010 of the routing platform device. Further, a device security component 1012 can verify a signature associated with the message and the routing platform 102 can execute the command (e.g., via the firewall component, IoT Hub component 110, and/or power management component 902, etc.). In one aspect, execution of the command can modify fields (e.g., policies, tags, etc.) of the data store(s) 212. The client component 1010 can provide the updated fields to the network server(s) 1006 and the updated fields can be viewed via the user interface (e.g., GUI) provided by the cloud interface component 1004.

In one aspect, the device security component 1012 and a network security component 1014 can be employed to protect sensitive data stored in the data store(s) 212 and the network data store(s) 1008, for example, by employing most any encryption technique(s). In one example, encryption can be performed by employing a set of symmetric and asymmetric keys. For example, when sensitive data (e.g., a password "abcdefgh") is to be stored in the data store(s) 212, a random symmetric key can be chosen from the set of symmetric keys and the sensitive data (along with identifier data indicative of the random symmetric key and a set of random numbers in the header) can be encrypted by employing the random symmetric key (e.g., AES_Encrypt ("abcdefgh")). Further, the sensitive data can be divided into a set of chunks of random sizes (e.g., "abc," "def," and "gh" for chunk size=3). Furthermore, a random asymmetric key can be chosen from the set of asymmetric keys and the chunks of data can be encrypted using the random asymmetric key. The random asymmetric key index used can be prepended and the encrypted version of the data can be stored in the data store(s) 212 (and a copy of the encrypted version can be stored in the network data store(s) 1008 during synchronization).

Further, in yet another aspect, the network security component 1014 can enforce stronger encryption by refreshing (e.g., periodically) the symmetric and asymmetric keys. In this example, scenario, the network security component 1014 can send a "refresh keys" message to the device security component 1012. The device security component 1012 can authenticate the message and initiate a "refresh sensitive cloud data" workflow. During the workflow, the network security component 1014 can generate an ephemeral key and encrypt the ephemeral key using device public keys (e.g., as described above by employing the randomly selected symmetric and asymmetric keys). Further, the network security component 1014 can encrypt the encrypted ephemeral key by employing cryptographic message syntax (CMS). In addition, the network security component 1014 can employ a symmetric shared key to further encrypt the data and can then transmit the data to the routing platform 102. The device security component 1012 can apply a corresponding decryption process to determine the ephemeral key. Further, the device security component 1012 can decrypt sensitive data stored in the data store(s) 212 by employing the old keys and re-encrypt the sensitive data by employing the ephemeral key. Furthermore, the device security component 1012 can update the data store(s) 212 with the newly encrypted information and initiate a synchronization process to synchronize data store(s) 212 with the network data store(s) 1008. The network security component 1014 can decrypt the sensitive data using its asymmetric key and symmetric keys and can additionally or optionally re-encrypt the data using a new set of keys.

Figure 11:
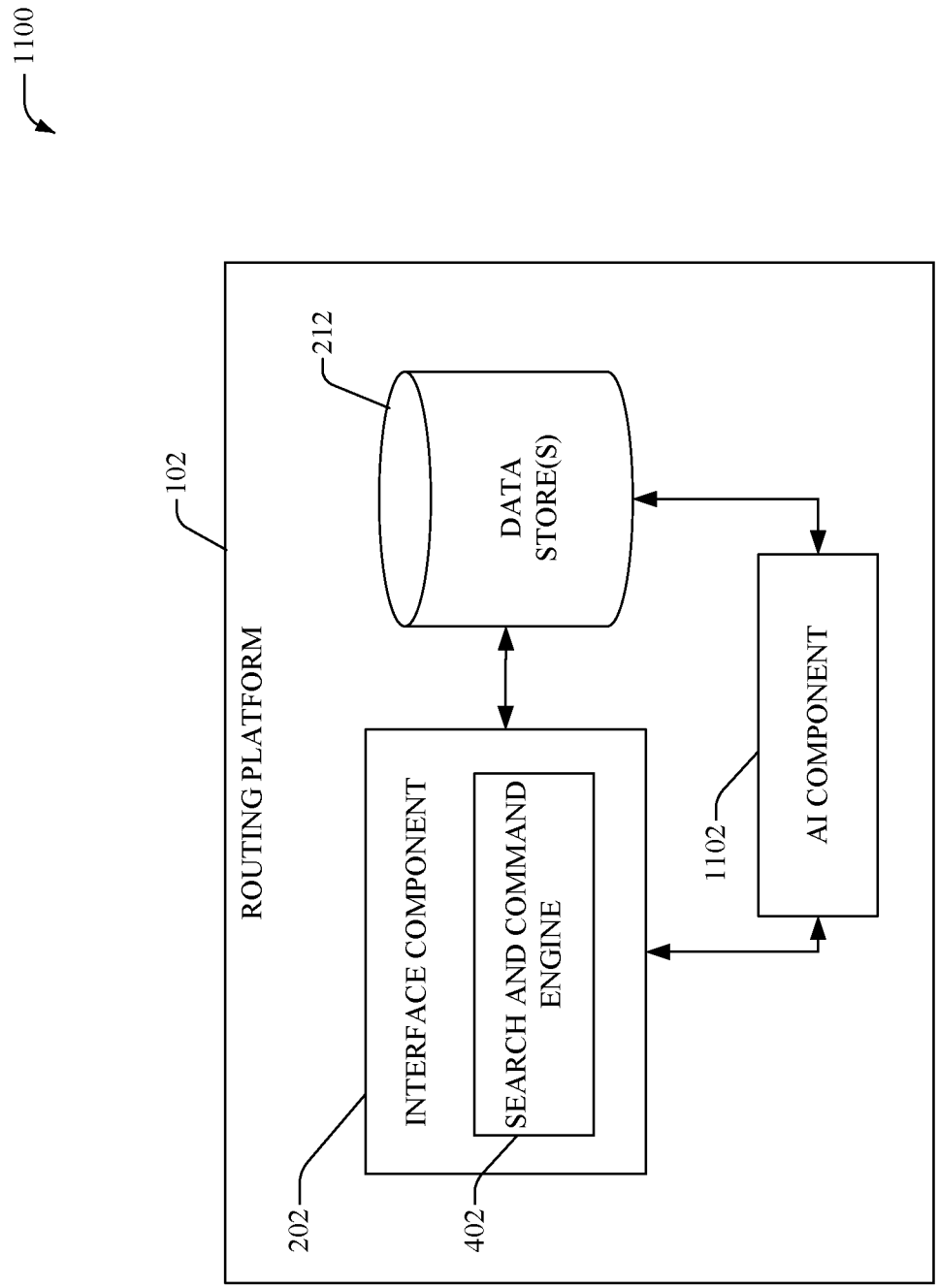
FIG. 11 illustrates an example system that facilitates automating one or more features in accordance with the subject embodiments.

Referring now to FIG. 11, there illustrated is an example system 1100 that employs an artificial intelligence (AI) component (1102) to facilitate automating one or more features in accordance with the subject embodiments. It can be noted that the routing platform 102, interface component 202, data store(s) 212, and search and command engine 402 can comprise functionality as more fully described herein, for example, as described above with regard to systems 100-200, 400, 600, 700, 900, and 1000.

In an example embodiment, system 1100 (e.g., in connection with automatically determining queries and/or commands) can employ various AI-based schemes (e.g., intelligent processing/analysis, machine learning, etc.) for carrying out various aspects thereof. For example, the AI component 1102 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 1102 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 1102 can be used to automatically learn and perform a number of functions, comprising but not limited to determining according to a predetermined criteria, words, phrases, commands, etc. that are likely to be input by a user. The criteria can comprise, but is not limited to, historical patterns and/or trends, preferences and/or policies, event data, availability data, device connection data, current time/date, and the like.

Figure 12:
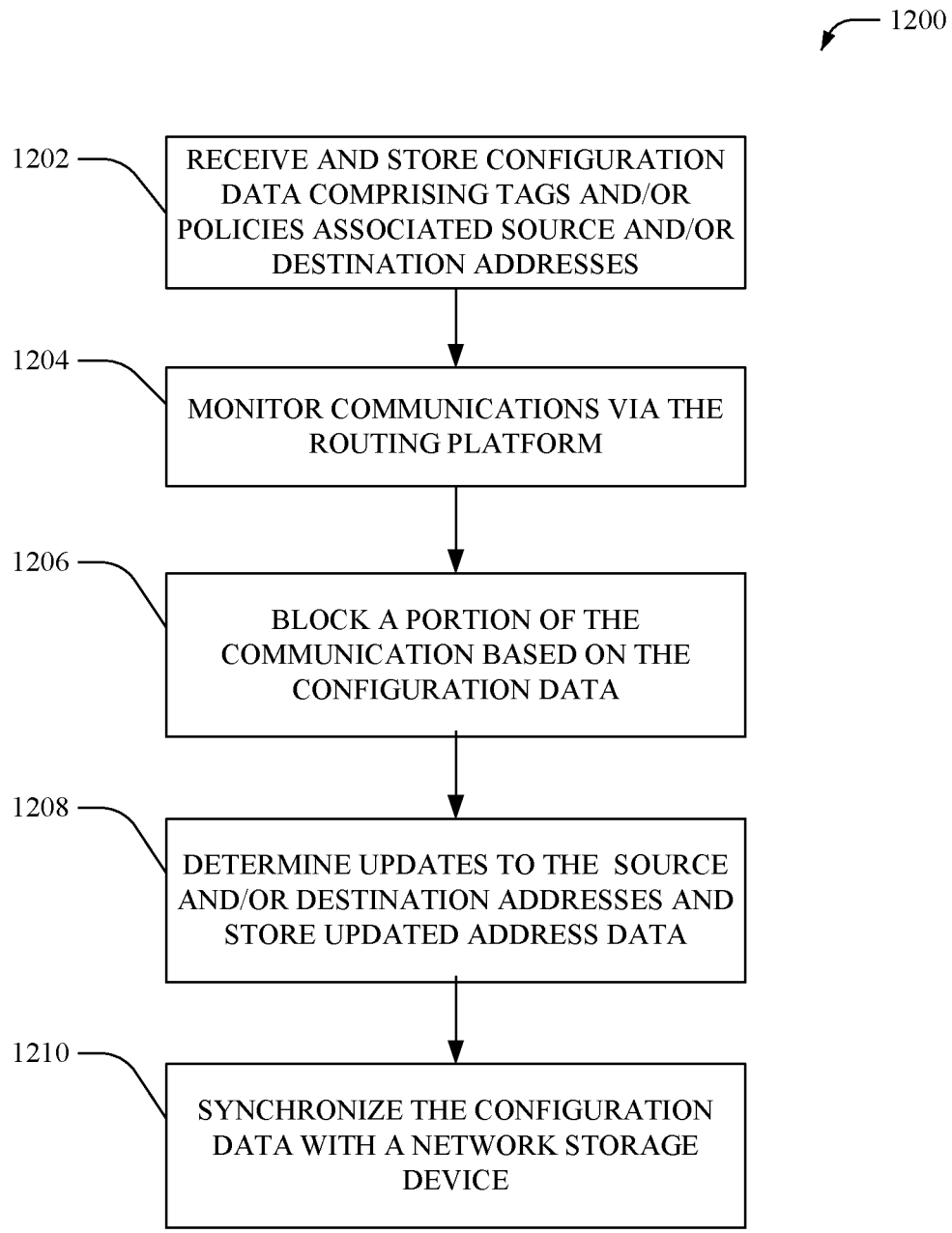
FIG. 12 illustrates an example method that facilitates configuration of a firewall implemented via router.
Figure 13:
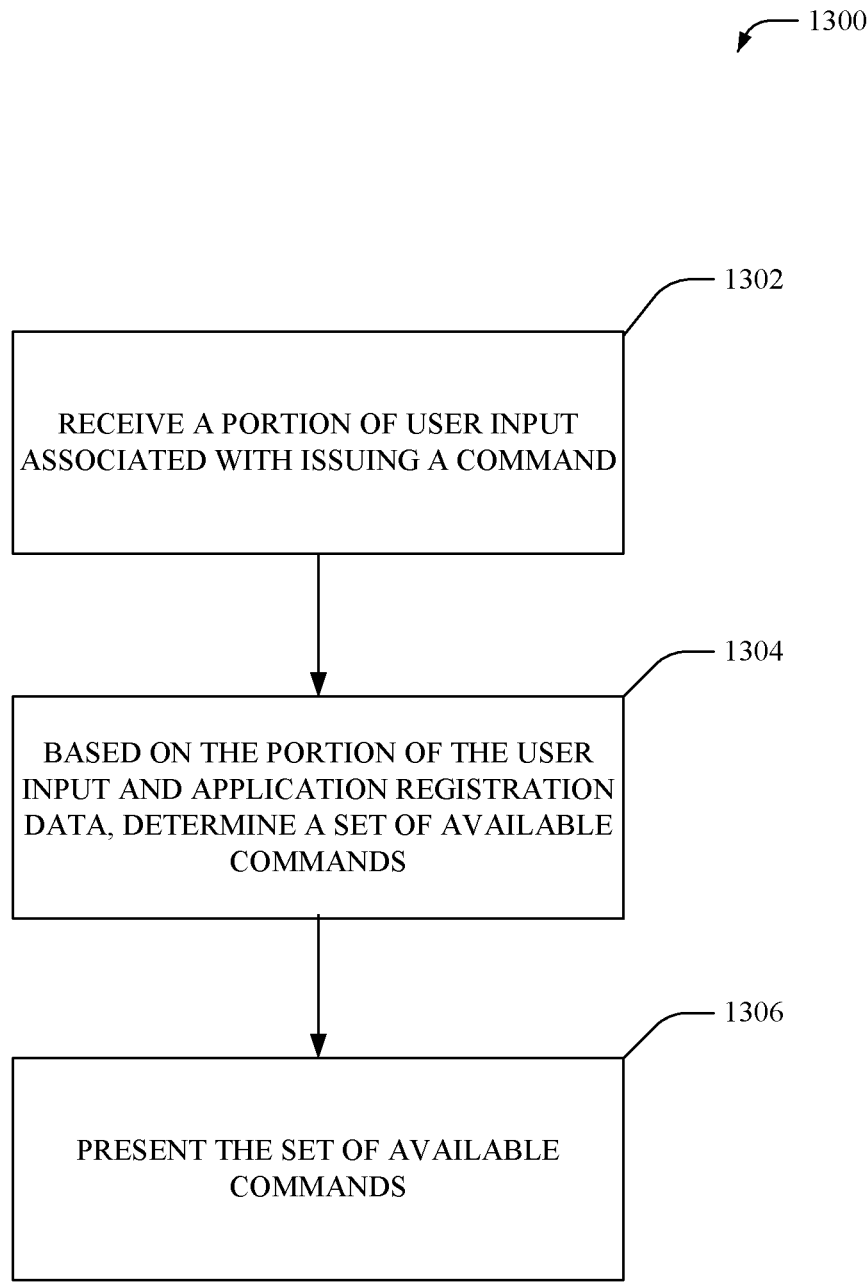
FIG. 13 illustrates an example method that facilitates a predictive text for entry for issuing commands.
Figure 14:
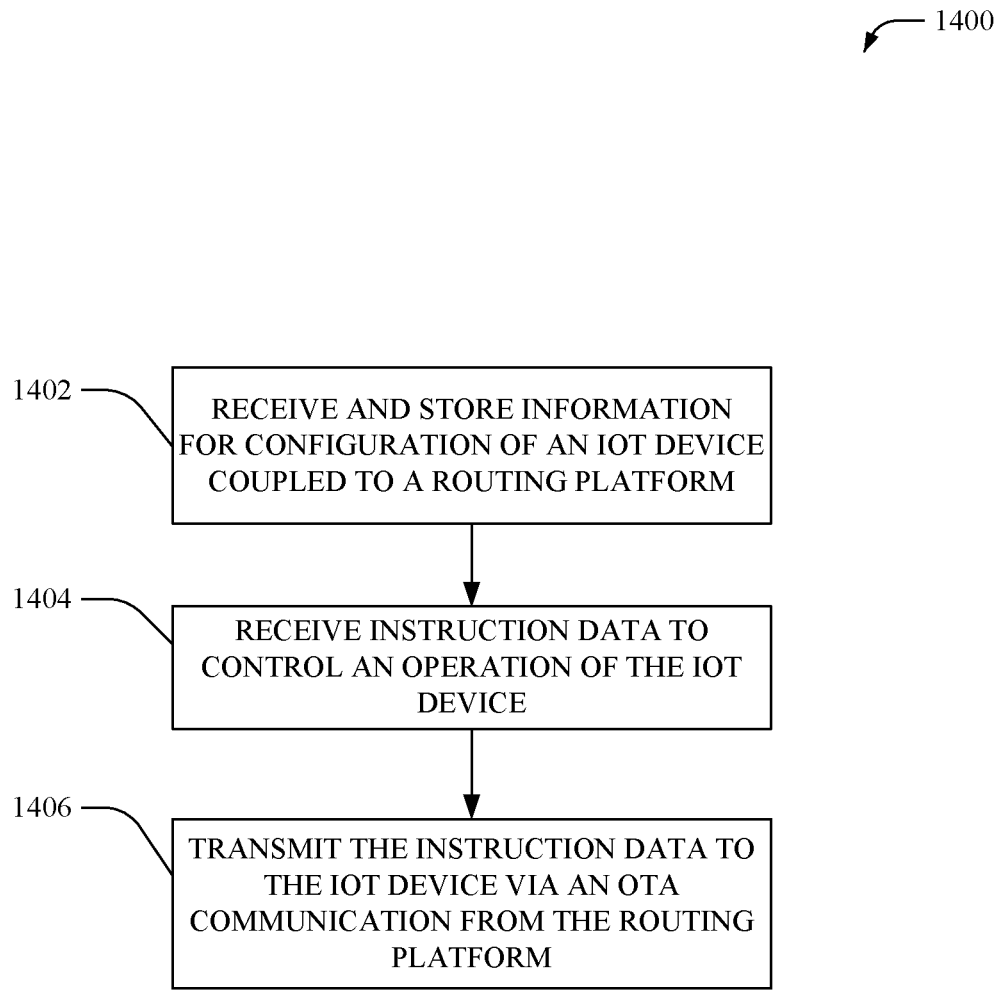
FIG. 14 illustrates an example method for controlling operations of an IoT device coupled to a routing platform.

FIGS. 12-14 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 12 there illustrated is an example method 1200 that facilitates configuration of a firewall implemented via router, according to an aspect of the subject disclosure. In an aspect, method 1200 can be implemented by one or more devices (e.g., router) of a routing platform and/or a communication network (e.g., cloud server). At 1202, configuration data can be received and stored. As an example, the configuration data include access policies for prohibiting access to/by specific devices and/or websites, tags that assign devices/websites to a group, and/or address data (e.g., IP address of malicious/inappropriate websites), etc. In one aspect, the configuration data can be input via the router, a UE coupled to the router over a LAN, a UE coupled to the router over a WAN, and/or can be imported from a network server.

At 1204, communications routed via the routing platform can be monitored. As an example, source and/or destination addresses associated with the communication and/or various other information (e.g., time, date, type of device, type of communication, etc.) can be compared with the configuration data. At 1206, a portion of the communication, for example, that does not satisfy the access policies, can be identified and blocked. Further, at 1208, updates to the source and/or destination addresses can be determined (e.g., received from one or more DNS servers) and the updated addresses can be stored. Furthermore, at 1210, the configuration data can be synchronized with a network storage device. It is noted that most any encryption technique can be employed to protect the data stored within the network storage device and/or the routing platform.

FIG. 13 illustrates an example method 1300 that facilitates a predictive text for entry for issuing commands, according to an aspect of the subject disclosure. As an example, method 1300 can be implemented by one or more network devices (e.g., router) of a routing platform and/or a communication network (e.g., cloud server). At 1302, a portion of user input associated with issuing a command can be received. For example, the user can start typing the first letter or group of letters within a search and command bar of a GUI. At 1304, a set of available commands (e.g., that complete the user input) can be determined based on the portion of the user input and/or application registration data (e.g., commands registered by an application). At 1306, the set of available commands can be presented to the user. As an example, the commands can include tags and/or policies associated with firewall and/or IoT hub operations.

Referring now to FIG. 14, there illustrated is a method 1400 for controlling operations of an IoT device coupled to a routing platform, according to an aspect of the subject disclosure. As an example, method 1400 can be implemented by one or more network devices (e.g., router) of a routing platform and/or a communication network (e.g., cloud server). At 1402, information for configuration of an IoT device coupled to the routing platform, can be received and stored. In one example, the information can be preconfigured by a manufacturer and/or service provider and can be managed (updated and/or deleted) by a user. At 1404, instruction data to control an operation of the IoT device can be received. Further, at 1406, the instruction data can be transmitted from the routing platform to the IoT device via an OTA protocol. As an example, the IoT device can comprise a microcontroller that can manage IoT device operations.

Figure 15:
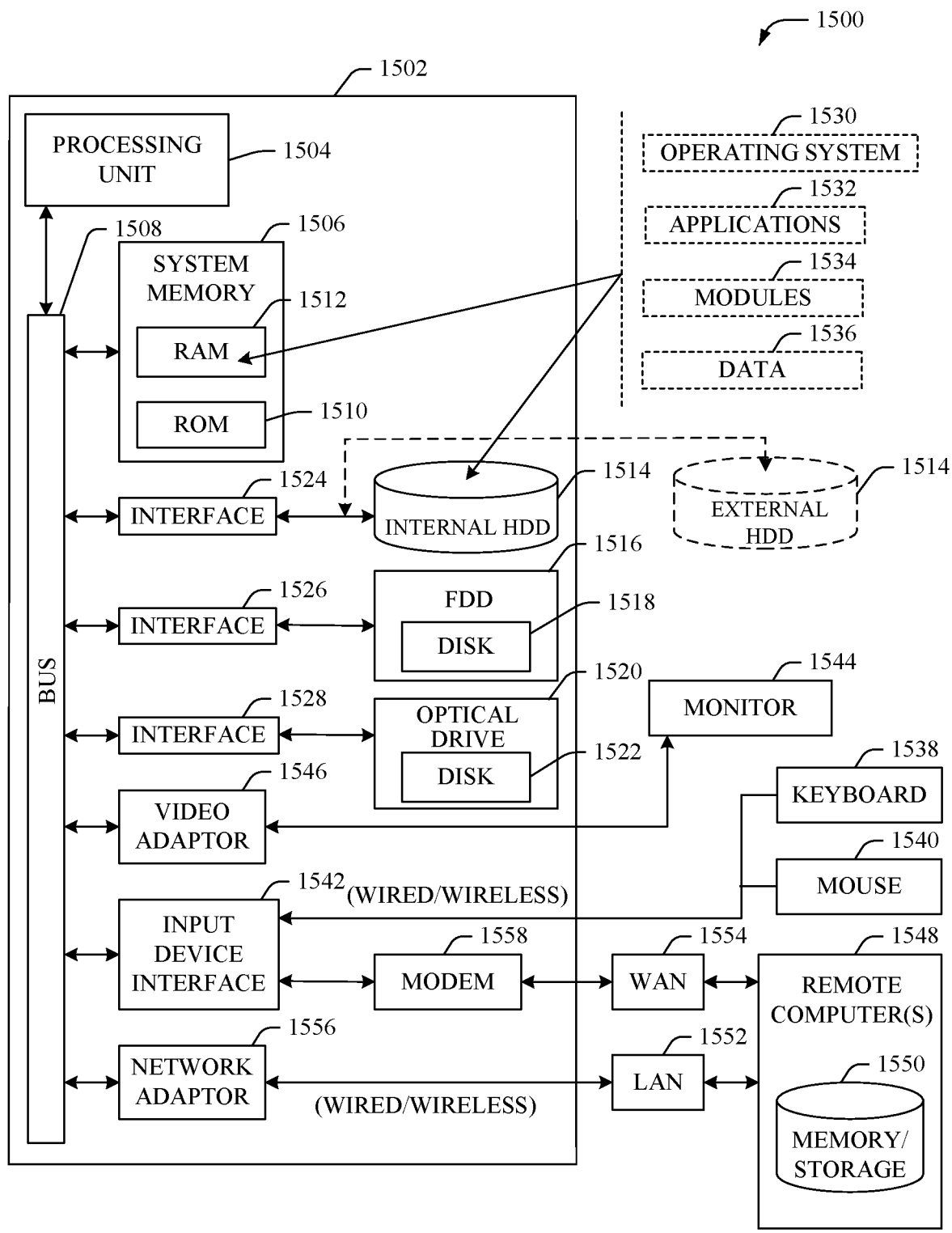
FIG. 15 illustrates a block diagram of a computer operable to execute the disclosed communication architecture.

Referring now to FIG. 15, there is illustrated a block diagram of a computer 1502 operable to execute the disclosed communication architecture. In order to provide additional context for various aspects of the disclosed subject matter, FIG. 15 and the following discussion are intended to provide a brief, general description of a suitable computing environment 1500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 15, the example environment 1500 for implementing various aspects of the specification comprises a computer 1502, the computer 1502 comprising a processing unit 1504, a system memory 1506 and a system bus 1508. As an example, the component(s), application(s) server(s), equipment, system(s), interface(s), controller(s), node(s), engine(s), entity(ies), function(s), platform(s), and/or device(s) (e.g., routing platform 102, source 103, UE(s) 104, destination 105, access control component 107, firewall component 108, network data store 109, IoT hub component 110, interface component 202, data store(s) 212, monitoring component 214, blocking component 216, search and command engine 402, publishing components 1-2 ($602_1$-$602_N$), routing platforms 1-2 ($102_1$-$102_N$), data stores 1-2 ($212_1$-$212_N$), IoT device(s) 702, power management component 902, power strip 906, devices ($908_1$-$908_M$), UE 1002, cloud interface component 1004, network server(s) 1006, network data store(s) 1008, client component 1010, device security component 1012, network security component 1014, AI component 1102, etc.) disclosed herein with respect to systems 100, 150, 200, 400, 600, 700, and 900 can each comprise at least a portion of the computer 1502. The system bus 1508 couples system components comprising, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 comprises read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during startup. The RAM 1512 can also comprise a high-speed RAM such as static RAM for caching data.

The computer 1502 further comprises an internal hard disk drive (HDD) 1514, which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1512, comprising an operating system 1530, one or more application programs 1532, other program modules 1534 and program data 1536. All or portions of the operating system, applications, modules, and/or data can also be cached in the RAM 1512. It is noted that the specification can be implemented with various commercially available operating systems or combinations of operating systems.

A user can enter commands and information into the computer 1502 through one or more wired/wireless input devices, e.g., a keyboard 1538 and/or a pointing device, such as a mouse 1540 or a touchscreen or touchpad (not illustrated). These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc. A monitor 1544 or other type of display device is also connected to the system bus 1508 via an interface, such as a video adapter 1546.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically comprises many or all of the elements described relative to the computer 1502, although, for purposes of brevity, only a memory/storage device 1550 is illustrated. The logical connections depicted comprise wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 is connected to the local network 1552 through a wired and/or wireless communication network interface or adapter 1556. The adapter 1556 can facilitate wired or wireless communication to the LAN 1552, which can also comprise a wireless access point disposed thereon for communicating with the wireless adapter 1556.

When used in a WAN networking environment, the computer 1502 can comprise a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be noted that the network connections shown are example and other means of establishing a communications link between the computers can be used.

The computer 1502 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 16:
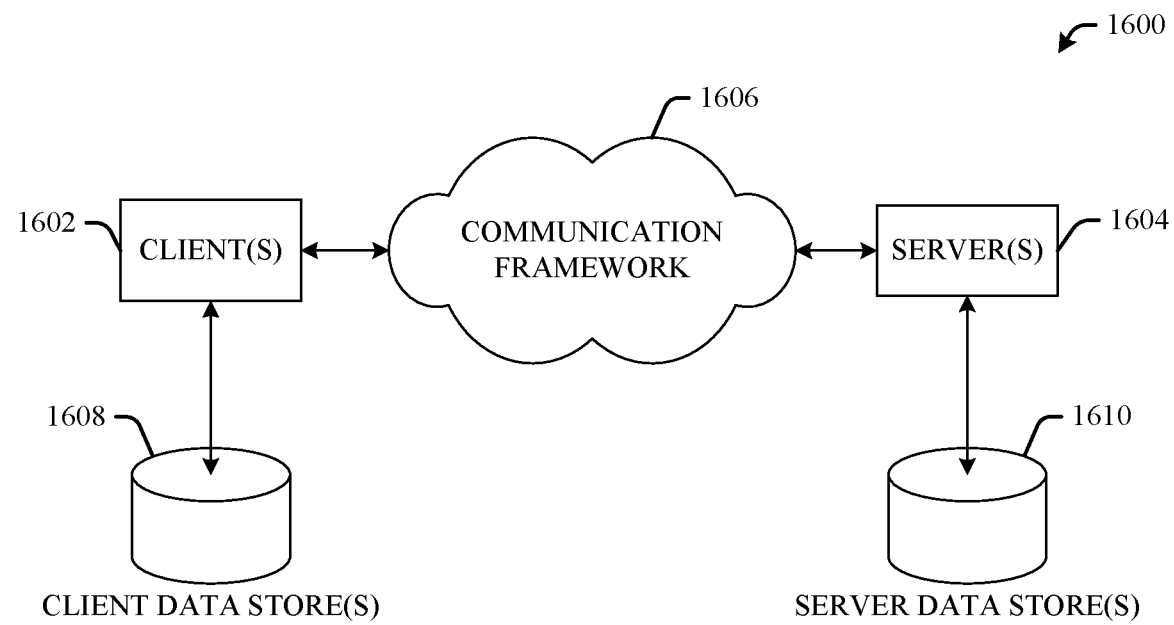
FIG. 16 illustrates a schematic block diagram of a computing environment in accordance with the subject specification

Referring now to FIG. 16, there is illustrated a schematic block diagram of a computing environment 1600 in accordance with the subject specification. The system 1600 comprises one or more client(s) 1602. The client(s) 1602 can be hardware and/or software (e.g., threads, processes, computing devices).

The system 1600 also comprises one or more server(s) 1604. The server(s) 1604 can also be hardware and/or software (e.g., threads, processes, computing devices). The servers 1604 can house threads to perform transformations by employing the specification, for example. One possible communication between a client 1602 and a server 1604 can be in the form of a data packet adapted to be transmitted between two or more computer processes. The data packet may comprise a cookie and/or associated contextual information, for example. The system 1600 comprises a communication framework 1606 (e.g., a global communication network such as the Internet, cellular network, etc.) that can be employed to facilitate communications between the client(s) 1602 and the server(s) 1604.

Communications can be facilitated via a wired (comprising optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving communication data that is to be routed from a source device to a destination device via a routing platform device;
        in response to the receiving of the communication data, determining tag data associated with the communication data based on a correlation of information related to the communication data, wherein the tag data classifies at least one of the source device, the destination device, or a user identity associated with at least one of the source device or the destination device, wherein at least a portion of the tag data is user-defined, and wherein the tag data is maintained independently of the communications data;
        determining policy data for source devices, destination devices, and user identities that are tagged with the tag data, the policy data defining an access control policy that is associated with at least one of prohibiting or allowing, according to specified parameters of the access control policy, a transmission of the communication data from the source device to the destination device; and
        facilitating an application of the access control policy, wherein the access control policy is applied at least based on a substring of domain name data associated with at least one of the source device or the destination device, and where the substring differs from a subdomain of domain name data.

2. The system of claim 1, wherein the determining of the policy data for the source devices, the destination devices, and the user identities that are tagged with the tag data is performed dynamically after the receiving of communication data that is to be routed from the source device to the destination device.

3. The system of claim 1, wherein the operations further comprise:
    receiving a command expressed in a natural language form; and
    processing the command to identify the tag data.

4. The system of claim 1, wherein the tag data comprises criteria data that identifies a level of relevance for a tag as applied to at least one of the source device, the destination device, or the user identity associated with at least one of the source device or the destination device.

5. The system of claim 1, wherein the tag data comprises a first tag that is assigned to at least one of the source device, the destination device, or the user identity associated with at least one of the source device or the destination device, and a second tag that is assigned to the same at least one of the source device, the destination device, or the user identity associated with at least one of the source device or the destination device as the first tag.

6. The system of claim 1, wherein the operations further comprise:
    obtaining configuration data that defines at least one of the tag data or the policy data from a first shared network data store of a communication network coupled to the routing platform device, wherein the routing platform device comprises a first routing platform device of a first local area network and wherein the determining of the tag data comprises determining the tag data based on shared data stored in a second shared network data store accessible to a second routing platform device of a second local area network, and wherein the shared data is determined based on at least one of open-source data or proprietary data published by one or more user devices.

7. The system of claim 1, wherein the operations further comprise:
    obtaining configuration data that defines at least one of the tag data or the policy data from a first shared network data store of a communication network coupled to the routing platform device, wherein the routing platform device is a first routing platform device of a first local area network, and wherein the operations further comprise:
    in response to determining that at least a portion of the configuration data has been assigned a label assigned with shared data, directing at least the portion of the configuration data to a second shared network data store that is accessible to second routing platform devices of second local area networks that are able to utilize at least the portion of the configuration data to implement access control.

8. The system of claim 1, wherein the correlation of the information comprises application of a match function based on analyzing at least one of a domain name service server resource record, a tag, or relative criteria data associated with at least one of the source device, the destination device, or the communication data.

9. A method, comprising:
    determining, by a first routing platform device of a first local area network, configuration data that is employable to configure the first routing platform device to facilitate routing of communication data between network devices, of one or more communication networks, that are coupled to the first routing platform device, wherein the first routing platform device comprises a processor;
    receiving, by the first routing platform device, communication data that is to be routed from a source device to a destination device via the first routing platform device, wherein the communication data is associated with tag data based on a correlation of information related to the communication data, wherein the tag data classifies at least one of the source device, the destination device, or a user identity associated with at least one of the source device or the destination device, wherein at least a portion of the tag data is user-defined, and wherein the tag data is not transmitted with the communications data;

determining, by the first routing platform device, policy data from the tag data that is indicative of an access control policy that is associated with at least one of denying or allowing a transmission of the communication data, and wherein the determining comprises obtaining, via an interface, a first portion of the configuration data; and facilitating, by the first routing platform device, an application of the access control policy, wherein the access control policy is derived from a portion of domain name data associated with at least one of the source device or the destination device, and wherein the substring differs from a subdomain of domain name data.

10. The method of claim 9, wherein the determining of the policy data comprises:

identifying, by the first routing platform device, a match between the tag data and at least part of a domain name service resource record of at least one of the network devices.

11. The method of claim 10, wherein the match comprises a full match between the tag data and at least the part of the domain name service resource record.

12. The method of claim 10, wherein the match comprises a partial match between the tag data and at least the part of the domain name service resource record.

13. The method of claim 10, further comprising:

storing, by the first routing platform device, an identification of the match in a tag table that is accessed while performing the determining of the policy data.

14. The method of claim 9, further comprising:

facilitating, by the first routing platform device, a transfer of the configuration data to a network data store of the one or more communication networks, wherein the configuration data is employable by a second routing platform device of a second local area network to facilitate access control.

15. The method of claim 9, wherein the determining of the configuration data comprises importing the configuration data from a network data store associated with one communication network of the one or more communication networks.

16. A non-transitory machine-readable medium, comprising executable instructions that, when executed by a processor, facilitate performance of operations, comprising:

determining tag data associated with communication data based on a correlation related to the communication data, wherein the tag data comprises a set of tags employable to classify a source device, a destination device, and a user identity associated with at least one of the source device or the destination device, wherein at least a portion of the tag data is user-defined, and wherein the tag data is kept independently of the communications data;

correlating the tag data to determine policy data indicative of an access control policy that is associated with at least one of preventing or allowing a transmission of the communication data from the source device to the destination device; and facilitating an application of the access control policy, wherein the access control policy is derived from a portion of domain name data associated with at least one of the source device or the destination device, and wherein the substring differs from a subdomain of domain name data.

17. The non-transitory machine-readable medium of claim 16, wherein the operations further comprise:

detecting updates to address data comprising one or more of source addresses or destination addresses of the policy data.

18. The non-transitory machine-readable medium of claim 16, wherein the operations further comprise:

receiving configuration data that is employable to facilitate routing of the communication data between network devices, of one or more communication networks, and wherein the configuration data is received via an interface operable to receive text instructions representative of a search instruction or a command.

19. The non-transitory machine-readable medium of claim 16, wherein the operations further comprise:

receiving configuration data that is employable to facilitate routing of the communication data between network devices, of one or more communication networks, and wherein the configuration data is received via an audio interface operable to receive voice instructions.

20. The non-transitory machine-readable medium of claim 16, wherein the operations further comprise:

receiving configuration data that is employable to facilitate routing of the communication data between network devices, of one or more communication networks, and wherein the configuration data is received via a video interface operable to receive images from which an instruction is determined based on image processing of the images.

* * * * *